US011775850B2

(12) United States Patent
Campos et al.

(10) Patent No.: US 11,775,850 B2
(45) Date of Patent: Oct. 3, 2023

(54) ARTIFICIAL INTELLIGENCE ENGINE HAVING VARIOUS ALGORITHMS TO BUILD DIFFERENT CONCEPTS CONTAINED WITHIN A SAME AI MODEL

(71) Applicant: Microsoft Technology Licensing, LLC, Redmond, WA (US)

(72) Inventors: Marcos Campos, Carlsbad, CA (US); Aditya Gudimella, Dublin, CA (US); Ruofan Kong, El Cerrito, CA (US); Matthew Brown, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1131 days.

(21) Appl. No.: 16/104,044

(22) Filed: Aug. 16, 2018

(65) Prior Publication Data

US 2018/0357552 A1 Dec. 13, 2018

Related U.S. Application Data

(63) Continuation-in-part of application No. 15/417,056, filed on Jan. 26, 2017, now Pat. No. 10,671,938.
(Continued)

(51) Int. Cl.
*G06N 5/04* (2006.01)
*G06N 99/00* (2019.01)
(Continued)

(52) U.S. Cl.
CPC .......... *G06N 5/043* (2013.01); *G06F 16/901* (2019.01); *G06N 3/02* (2013.01); *G06N 3/045* (2023.01);
(Continued)

(58) Field of Classification Search
None
See application file for complete search history.

(56) References Cited

U.S. PATENT DOCUMENTS 5,581,662 A 12/1996 Furuta et al.
5,619,618 A 4/1997 Bigus
(Continued)

FOREIGN PATENT DOCUMENTS

AU 2001251476 A8 10/2001
CN 101645083 A 2/2010
(Continued)

OTHER PUBLICATIONS

"Non Final Office Action Issued in U.S. Appl. No. 15/416,970", dated Nov. 21, 2019, 12 Pages.
(Continued)

*Primary Examiner* — Umut Onat
(74) *Attorney, Agent, or Firm* — Alleman Hall Creasman & Tuttle LLP

(57) ABSTRACT

The AI engine has a first module that chooses from a library of algorithms to use when automatically assembling and building different learning topologies to solve different concepts making up a resulting AI model. The AI engine may integrate both i) one or more dynamic programming training algorithms and ii) one or more policy optimization algorithms, to build the different learning topologies to solve the different concepts contained with an AI model in order to solve a wide variety of problem types. Each concept contained in the AI model can use a most appropriate approach for achieving a mission of that concept. A learning topology representing a first concept can be built by the first module with a first dynamic programming training algorithm, while a learning topology representing a second
(Continued)

concept in the same AI model can be built by the first module with a first policy optimization algorithm.

20 Claims, 22 Drawing Sheets

Related U.S. Application Data

(60) Provisional application No. 62/555,584, filed on Sep. 7, 2017, provisional application No. 62/547,339, filed on Aug. 18, 2017, provisional application No. 62/287,861, filed on Jan. 27, 2016.

(51) Int. Cl.
　　*G06F 17/30*　　(2006.01)
　　*G06N 3/02*　　(2006.01)
　　*G06N 5/043*　　(2023.01)
　　*G06N 20/00*　　(2019.01)
　　*G06F 16/901*　　(2019.01)
　　*G06N 3/08*　　(2023.01)
　　*G06N 3/045*　　(2023.01)
　　*G06N 3/008*　　(2023.01)
　　*G06N 3/044*　　(2023.01)

(52) U.S. Cl.
　　CPC ............. *G06N 3/08* (2013.01); *G06N 20/00* (2019.01); *G06N 3/008* (2013.01); *G06N 3/044* (2023.01)

(56) References Cited

U.S. PATENT DOCUMENTS

| | | |
|---|---|---|
| 5,681,496 A | 10/1997 | Brownlow et al. |
| 6,449,603 B1 | 9/2002 | Hunter |
| 7,016,881 B2 | 3/2006 | Li et al. |
| 7,386,522 B1 | 6/2008 | Bigus et al. |
| 7,801,591 B1 | 9/2010 | Shusterman |
| 7,936,915 B2 | 5/2011 | Brown et al. |
| 8,396,286 B1 | 3/2013 | Aradhye et al. |
| 8,442,839 B2 | 5/2013 | Yen et al. |
| 8,521,664 B1 | 8/2013 | Lin et al. |
| 9,213,527 B2 | 12/2015 | Krueger et al. |
| 9,235,653 B2 | 1/2016 | Talmon et al. |
| 9,390,404 B2 | 7/2016 | Ivanic et al. |
| 9,443,192 B1 | 9/2016 | Cosic |
| 9,460,088 B1 | 10/2016 | Sak et al. |
| 9,524,461 B1 | 12/2016 | Huynh |
| 9,558,454 B2 | 1/2017 | Strassner |
| 10,504,030 B2 | 12/2019 | Kipersztok et al. |
| 10,586,173 B2 | 3/2020 | Hammond et al. |
| 10,691,843 B2 | 6/2020 | Estee et al. |
| 10,800,040 B1 | 10/2020 | Beckman et al. |
| 10,847,266 B1 | 11/2020 | Ross et al. |
| 10,990,894 B2 | 4/2021 | Shaashua et al. |
| 11,188,821 B1 * | 11/2021 | Kalakrishnan ......... B25J 9/1664 |
| 11,423,454 B2 | 8/2022 | Addepalli |
| 2003/0004672 A1 | 1/2003 | Thurman |
| 2003/0041047 A1 | 2/2003 | Chang et al. |
| 2003/0204311 A1 | 10/2003 | Bush |
| 2004/0122788 A1 | 6/2004 | Griffith et al. |
| 2004/0255291 A1 | 12/2004 | Sierer et al. |
| 2005/0034109 A1 | 2/2005 | Hamilton et al. |
| 2005/0114280 A1 | 5/2005 | Rising, III |
| 2005/0125440 A1 | 6/2005 | Hirst |
| 2005/0132032 A1 | 6/2005 | Bertrand |
| 2005/0197991 A1 | 9/2005 | Wray et al. |
| 2005/0238198 A1 | 10/2005 | Brown et al. |
| 2006/0166174 A1 | 7/2006 | Rowe et al. |
| 2006/0218107 A1 | 9/2006 | Young |
| 2006/0271210 A1 | 11/2006 | Subbu et al. |
| 2007/0101331 A1 | 5/2007 | Krebs |
| 2007/0168328 A1 | 7/2007 | Peralta |
| 2008/0298544 A1 | 12/2008 | Dugan |
| 2009/0106165 A1 | 4/2009 | Solomon |
| 2009/0106178 A1 | 4/2009 | Chu |
| 2009/0119587 A1 | 5/2009 | Allen et al. |
| 2009/0204563 A1 | 8/2009 | Gerber et al. |
| 2010/0070948 A1 | 3/2010 | Rama et al. |
| 2010/0088258 A1 | 4/2010 | Oaten et al. |
| 2010/0094790 A1 | 4/2010 | Gnojewski |
| 2010/0106714 A1 | 4/2010 | Lim et al. |
| 2010/0232686 A1 | 9/2010 | Dewan et al. |
| 2010/0280863 A1 | 11/2010 | Wilcock et al. |
| 2012/0139930 A1 | 6/2012 | Rogers |
| 2012/0159090 A1 | 6/2012 | Andrews et al. |
| 2012/0209794 A1 | 8/2012 | Jones, III |
| 2012/0239598 A1 | 9/2012 | Cascaval et al. |
| 2012/0310864 A1 | 12/2012 | Chakraborty et al. |
| 2014/0302476 A1 | 10/2014 | Sorensen et al. |
| 2015/0066929 A1 | 3/2015 | Satzke et al. |
| 2015/0339570 A1 | 11/2015 | Scheffler |
| 2016/0034809 A1 | 2/2016 | Trenholm et al. |
| 2016/0078361 A1 | 3/2016 | Brueckner et al. |
| 2016/0188843 A1 | 6/2016 | Staples, II et al. |
| 2016/0260428 A1 | 9/2016 | Matsuda et al. |
| 2016/0283202 A1 | 9/2016 | Sellers-blais |
| 2016/0314402 A1 | 10/2016 | Buccapatnam Tirumala et al. |
| 2016/0358098 A1 | 12/2016 | Duesterwald et al. |
| 2017/0019315 A1 | 1/2017 | Tapia et al. |
| 2017/0061283 A1 | 3/2017 | Rasmussen et al. |
| 2017/0091670 A1 | 3/2017 | Gulin et al. |
| 2017/0193361 A1 | 7/2017 | Chilimbi et al. |
| 2017/0213126 A1 | 7/2017 | Hammond et al. |
| 2017/0213128 A1 | 7/2017 | Hammond et al. |
| 2017/0213131 A1 | 7/2017 | Hammond et al. |
| 2017/0213132 A1 | 7/2017 | Hammond et al. |
| 2017/0213154 A1 | 7/2017 | Hammond et al. |
| 2017/0213155 A1 | 7/2017 | Hammond et al. |
| 2017/0213156 A1 | 7/2017 | Hammond et al. |
| 2017/0220943 A1 | 8/2017 | Duncan et al. |
| 2017/0262769 A1 | 9/2017 | Mcshane et al. |
| 2017/0294027 A1 | 10/2017 | Babenko et al. |
| 2017/0308800 A1 | 10/2017 | Cichon et al. |
| 2018/0060759 A1 | 3/2018 | Chu et al. |
| 2018/0191867 A1 | 7/2018 | Siebel et al. |
| 2018/0240062 A1 | 8/2018 | Crabtree et al. |
| 2018/0293057 A1 | 10/2018 | Sun et al. |
| 2018/0293463 A1 | 10/2018 | Brown |
| 2018/0293493 A1 | 10/2018 | Kalamkar et al. |
| 2018/0293498 A1 | 10/2018 | Campos et al. |
| 2018/0293517 A1 | 10/2018 | Browne et al. |
| 2018/0307945 A1 | 10/2018 | Haigh et al. |
| 2018/0357047 A1 | 12/2018 | Brown et al. |
| 2018/0357152 A1 | 12/2018 | Browne et al. |
| 2018/0357543 A1 | 12/2018 | Brown et al. |
| 2019/0095794 A1 | 3/2019 | Aldana López et al. |
| 2019/0232488 A1 * | 8/2019 | Levine ............... G06N 3/008 |
| 2020/0117427 A1 | 4/2020 | McGloin et al. |
| 2020/0250583 A1 | 8/2020 | Hammond et al. |
| 2020/0265302 A1 | 8/2020 | Sanyal et al. |
| 2021/0042530 A1 | 2/2021 | Kim et al. |
| 2021/0248514 A1 | 8/2021 | Cella et al. |
| 2022/0138656 A1 | 5/2022 | Le et al. |
| 2022/0164879 A1 | 5/2022 | Cella |
| 2022/0172050 A1 | 6/2022 | Dalli et al. |

FOREIGN PATENT DOCUMENTS

| | | |
|---|---|---|
| CN | 102075560 A | 5/2011 |
| CN | 102141991 A | 8/2011 |
| CN | 102222005 A | 10/2011 |
| CN | 102509039 A | 6/2012 |
| CN | 102591654 A | 7/2012 |
| CN | 102707982 A | 10/2012 |
| CN | 104106276 A | 10/2014 |
| CN | 104520880 A | 4/2015 |
| CN | 104965978 A | 10/2015 |

(56) References Cited

FOREIGN PATENT DOCUMENTS

| | | |
|---|---|---|
| CN | 105068661 A | 11/2015 |
| WO | 2015017706 A2 | 2/2015 |

OTHER PUBLICATIONS

"Non Final Office Action Issued in U.S. Appl. No. 15/417,033", dated Nov. 26, 2019, 13 Pages.
"Final Office Action Issued in U.S. Appl. No. 15/416,970", dated Mar. 3, 2020, 7 Pages.
"Final Office Action Issued in U.S. Appl. No. 15/417,086", dated Feb. 25, 2020, 18 Pages.
"Summons to Attend Oral Proceedings Issued in European Patent Application No. 17745030.1", Mailed Date: Feb. 25, 2022, 6 Pages.
"Office Action Issued in European Patent Application No. 17745016.0", dated Jul. 13, 2020, 9 Pages.
Lirov, Yuval, "Computer Aided Neural Network Engineering", In the Journal of Neural Networks, vol. 5, Issue 4, Jul. 1992, pp. 711-719.
Perera, et al., "ANNEbot: An Evolutionary Artificial Neural Network Framework", In the Proceedings of 4th International Conference on Intelligent and Advanced Systems, Jun. 12, 2012, pp. 40-45.
"Non-Final Office Action Issued in U.S. Appl. No. 15/416,970", dated Aug. 4, 2020, 7 Pages.
"Office Action and Search Report Issued in Chinese Patent Application No. 201780020322.4", dated Oct. 26, 2021, 8 Pages.
"Office Action Issued in Chinese Patent Application No. 201780020323.9", dated Nov. 29, 2021, 6 Pages.
"Non-Final Office Action Issued in U.S. Appl. No. 15/416,904", dated Aug. 14, 2019, 11 Pages.
"Notice of Allowance Issued in U.S. Appl. No. 15/417,075", dated Aug. 14, 2019, 9 Pages.
"Extended Search Report Issued in European Patent Application No. 17745025.1", dated Aug. 23, 2019, 9 Pages.
"Extended Search Report Issued in European Patent Application No. 17745016.0", dated Aug. 20, 2019, 8 Pages.
"Extended Search Report Issued in European Patent Application No. 17745030.1", dated Sep. 2, 2019, 7 Pages.
"Non Final Office Action Issued in U.S. Appl. No. 15/416,988", dated Oct. 3, 2019, 11 Pages.
"Non Final Office Action Issued in U.S. Appl. No. 15/417,056", dated Oct. 17, 2019, 10 Pages.
"Non Final Office Action Issued in U.S. Appl. No. 15/417,086", dated Nov. 7, 2019, 13 Pages.
Beale, et al., "Neural Network Toolbox 7 User's Guide", Retrieved from http://citeseerx.ist.psu.edu/viewdoc/download?doi=10.1.1.220.1640&rep=rep1&type=pdf, 2010, 951 Pages.
"Build, Ship, Run Any App, Anywhere", Retrieved From: https://web.archive.org/web/20170120165452/https://www.docker.com/, Retrieved On: Jan. 20, 2017, 7 Pages.
"What's The Difference Between An Application, Process, And Services?", Retrieved From: https://superuser.com/questions/209654/whats-the-difference-between-an-application-process-and-services. Retrieved On: Jan. 20, 2017, 1 Page.
Campos, et al., "Concept Network Reinforcement Learning For Flexible Dexterous Manipulation", Retrieved From: https://medium.com/@BonsaiAI/concept-network-reinforcement-learning-for-flexible-dexterous-manipulation-47bf459b19b9, Sep. 19, 2017, 11 Pages.
Chung, Kiuk, "Generating Recommendations At Amazon Scale With Apache Spark And Amazon DSSTNE", Retrieved From: https://aws.amazon.com/blogs/big-data/generating-recommendations-at-amazon-scale-with-apache-spark-and-amazon-dsstne/, Jul. 9, 2016, 8 Pages.
Dunn, Jeffrey, "Introducing FBLearner Flow: Facebook's AI Backbone", Retrieved From: https://web.archive.org/web/20180717150507/https://code.fb.com/core-data/introducing-fbleamer-flow-facebooks-ai-backbone/, May 9, 2016, 9 Pages.
Gray, Kathryn E.., "Towards Customizable Pedagogic Programming Languages", A dissertation submitted to the faculty of The University Of Utah in partial fulfillment of the requirements for the degree of Doctor of Philosophy in Computer Science, Aug. 2006, 156 Pages.
Gudimella, et al., "Deep Reinforcement Learning For Dexterous Manipulation With Concept Networks", Retrieved From: https://arxiv.org/pdf/1709.06977.pdf, Sep. 20, 2017, 16 Pages.
Hammond, et al., "AI For Everyone: An Introduction To Bonsai BRAIN And Inkling", In Bonsai AI, Inc. Whitepaper, Jan. 2016, 16 Pages.
He, Jinru, "Auto Scaling Pinterest", Retrieved From: https://web.archive.org/web/20161114182239/https://engineering.pinterest.com/blog/auto-scaling-pinterest, Sep. 16, 2016, 8 Pages.
Ma, Kevin, "Applying Deep Learning To Related Pins", Retrieved From: https://web.archive.org/web/20170214195127/https://engineering.pinterest.com/blog/applying-deep-learning-related-pins, Jan. 12, 2017, 6 Pages.
"International Search Report and Written Opinion Issued in PCT Application No. PCT/US2017/015446", dated Apr. 10, 2017, 6 Pages.
"International Search Report and Written Opinion Issued in PCT Application No. PCT/US2017/015460", dated May 5, 2017, 11 Pages.
"International Search Report and Written Opinion Issued in PCT Application No. PCT/US2017/015470", dated Apr. 21, 2017, 11 Pages.
Raschka, Sebastian, "Fitting A Model Via Closed-Form Equations Vs. Gradient Descent Vs Stochastic Gradient Descent Vs Mini-Batch Learning. What Is The Difference?", Retrieved From: https://sebastianraschka.com/faq/docs/closed-form-vs-gd.html. Retrieved From: Jan. 17, 2017, 6 Pages.
Tessler, et al., "A Deep Hierarchical Approach To Lifelong Learning In Minecraft", Retrieved From: https://arxiv.org/pdf/1604.07255.pdf, Nov. 30, 2016, 10 Pages.
"First Office Action and Search Report Issued in Chinese Patent Application No. 201780020322.4", dated Apr. 2, 2021, 12 Pages.
Arendt, et al., "A Tool Environment for Quality Assurance based on the Eclipse Modeling Framework", In Journal of Automated Software Engineering, vol. 20, Issue 2, Dec. 11, 2012, pp. 141-184.
Yang, et al., "Intelligent Search Engine Based on Knowledge Library", In Journal of Computer and Information Technology, vol. 18, Issue 2, Apr. 30, 2010, pp. 41-44.
"First Office Action and Search Report Issued in Chinese Patent Application No. 201780020323.9", dated May 24, 2021, 21 Pages.
Hengst, Bernhard, "Safe State Abstraction and Reusable Continuing Subtasks in Hierarchical Reinforcement Learning", In Proceedings of 20th Joint Conference on Artificial Intelligence, Dec. 2, 2007, 11 Pages.
"International Search Report & Written Opinion Issued in PCT Application No. PCT/US2018/037650", dated Aug. 31, 2018, 10 Pages.
"Non Final Office Action Issued in U.S. Appl. No. 16/009,039", dated Dec. 14, 2020, 32 Pages.
Luchian et al., "Automation of the infrastructure and services for an OpenStack deployment using chef tool", In 15th RoEduNet Conference: Networking in Education and Research, IEEE, Sep. 7, 2016, 5 Pages.
"Non Final Office Action Issued in U.S. Appl. No. 16/008,751", dated Dec. 1, 2020, 26 Pages.
"Summons to attend oral proceedings Issued in European Patent Application No. 17745016.0", dated Oct. 23, 2020, 7 Pages.
Ciancio et al., "Heuristic techniques to optimize neural network architecture in manufacturing applications", In Journal of Neural Computing and Applications vol. 27, Issue 7, Jul. 31, 2015, pp. 2001-2015.
"Notice of Allowance Issued in U.S. Appl. No. 16/009,153", dated Jul. 1, 2021, 11 Pages.
"Office Action issued in European Application No. 17745025.1", dated Jul. 15, 2021, 4 Pages.
"Office Action issued in European Application No. 17745030.1", dated Jul. 15, 2021, 4 Pages.
"Non Final Office Action Issued in U.S. Appl. No. 16/008,775", dated Jun. 16, 2022, 34 Pages.

(56) References Cited

OTHER PUBLICATIONS

"Non Final Office Action Issued in U.S. Appl. No. 16/104,060", dated Jul. 5, 2022, 11 Pages.
"Non Final Office Action Issued in U.S. Appl. No. 16/104,062", dated Jun. 3, 2022, 8 Pages.
"Non Final Office Action Issued In U.S. Appl. No. 16/854,687", dated Jul. 13, 2022, 6 Pages.
"Notice of Allowance Issued in European Patent Application No. 17745025.1", dated Jul. 14, 2022, 7 Pages.
Mnih, et al., "Human-Level Control through Deep Reinforcement Learning", In Journal of Nature, vol. 518, Issue 7540, Feb. 26, 2015, pp. 529-533.
Silver, et al., "Mastering the Game of Go with Deep Neural Networks and Tree Search", In Journal of Nature, vol. 529, Issue 7587, Jan. 28, 2016, pp. 484-489.
Sutton, et al., "Between MDPs and Semi-MDPs: A Framework for Temporal Abstraction in Reinforcement Learning", In Journal of Artificial Intelligence, vol. 112, Issue 1-2, Aug. 1999, pp. 181-211.
"Notice of Allowance Issued in European Patent Application No. 17745025.1", dated Oct. 27, 2022, 2 Pages.
"First Office Action and Search report Issued in Chinese Patent Application No. 201780020299.9", dated Nov. 18, 2022, 11 Pages.
"Final Office Action Issued in U.S. Appl. No. 16/008,775", dated Oct. 27, 2022, 35 Pages.
"Notice of Allowance Issued in U.S. Appl. No. 16/104,060", dated Nov. 14, 2022, 11 Pages.
"Notice of Allowance Issued in U.S. Appl. No. 16/104,062", dated Oct. 25, 2022, 7 Pages.
"Notice of Allowance Issued in U.S. Appl. No. 16/854,687", dated Nov. 23, 2022, 8 Pages.
"Notice of Allowance Issued in U.S. Appl. No. 17/447,642", dated Sep. 30, 2022, 10 Pages.
"Notice of Allowance Issued in U.S. Appl. No. 16/008,775", dated Apr. 10, 2023, 11 Pages.
"Non Final Office Action Issued in U.S. Appl. No. 16/104,054", dated Apr. 5, 2023, 48 Pages.
Brys, et al., "Reinforcement Learning from Demonstration through Shaping", In Proceedings of Twenty-Fourth International Joint Conference on Artificial Intelligence, Jul. 25, 2015, pp. 3352-3358.
Jankowska, et al., "Application of Perceptron Neural Networks for Fault Detection", In Journal of IFAC Proceedings Volumes, vol. 33, Issue 11, Jun. 1, 2000, pp. 207-212.
Mitri, Nicholasg., "Hierarchical Temporal Memory: An Investigative Look Into a New Cortical Algorithm", In thesis submitted to Department of Electrical and Computer Engineering, American University of Beirut, Apr. 27, 2015, 123 Pages.
Owens, et al., "A Multi-Output-Layer Perceptron", In Journal of Neural Computing & Applications, vol. 4, Mar. 1996, pp. 10-20.
"Notice of Allowance Issued in U.S. Appl. No. 16/104,062", dated Feb. 10, 2023, 7 Pages.
"Notice of Allowance Issued in U.S. Appl. No. 17/447,642", dated Feb. 24, 2023, 11 Pages.
"Notice of Allowance Issued in U.S. Appl. No. 16/104,060", dated Feb. 28, 2023, 10 Pages.
"Notice of Allowance Issued in U.S. Appl. No. 16/854,687", dated Mar. 8, 2023, 6 Pages.
"Notice of Allowance Issued in U.S. Appl. No. 16/104,062", dated May 30, 2023, 7 Pages.
"Notice of Allowance Issued in U.S. Appl. No. 16/104,060", dated Jun. 14, 2023, 8 Pages.
"Notice of Allowance Issued in U.S. Appl. No. 17/447,642", dated Jun. 28, 2023, 7 Pages.
"Second Office Action Issued in Chinese Patent Application No. 201780020299.9", dated Jul. 8, 2023, 6 Pages.

* cited by examiner

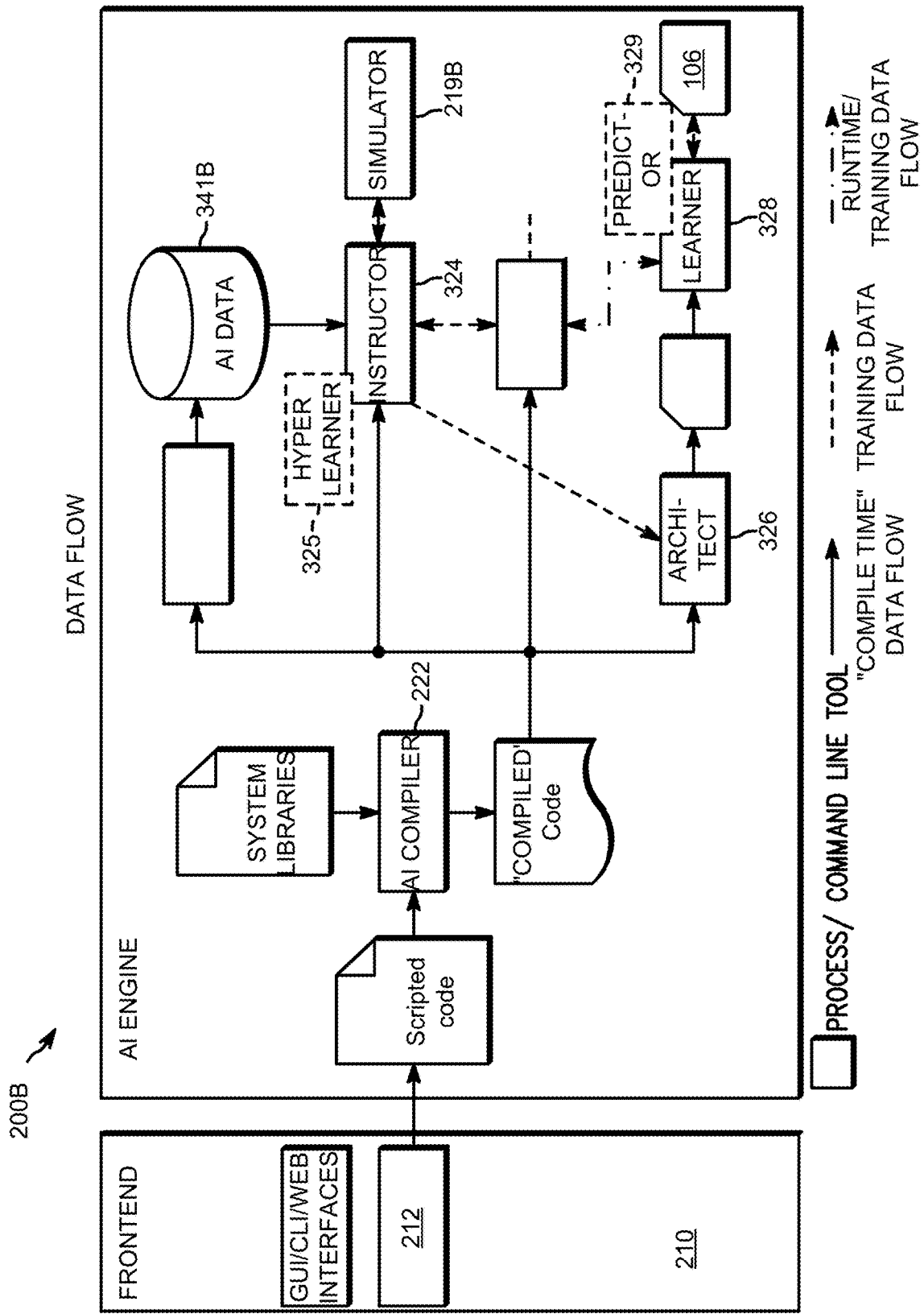

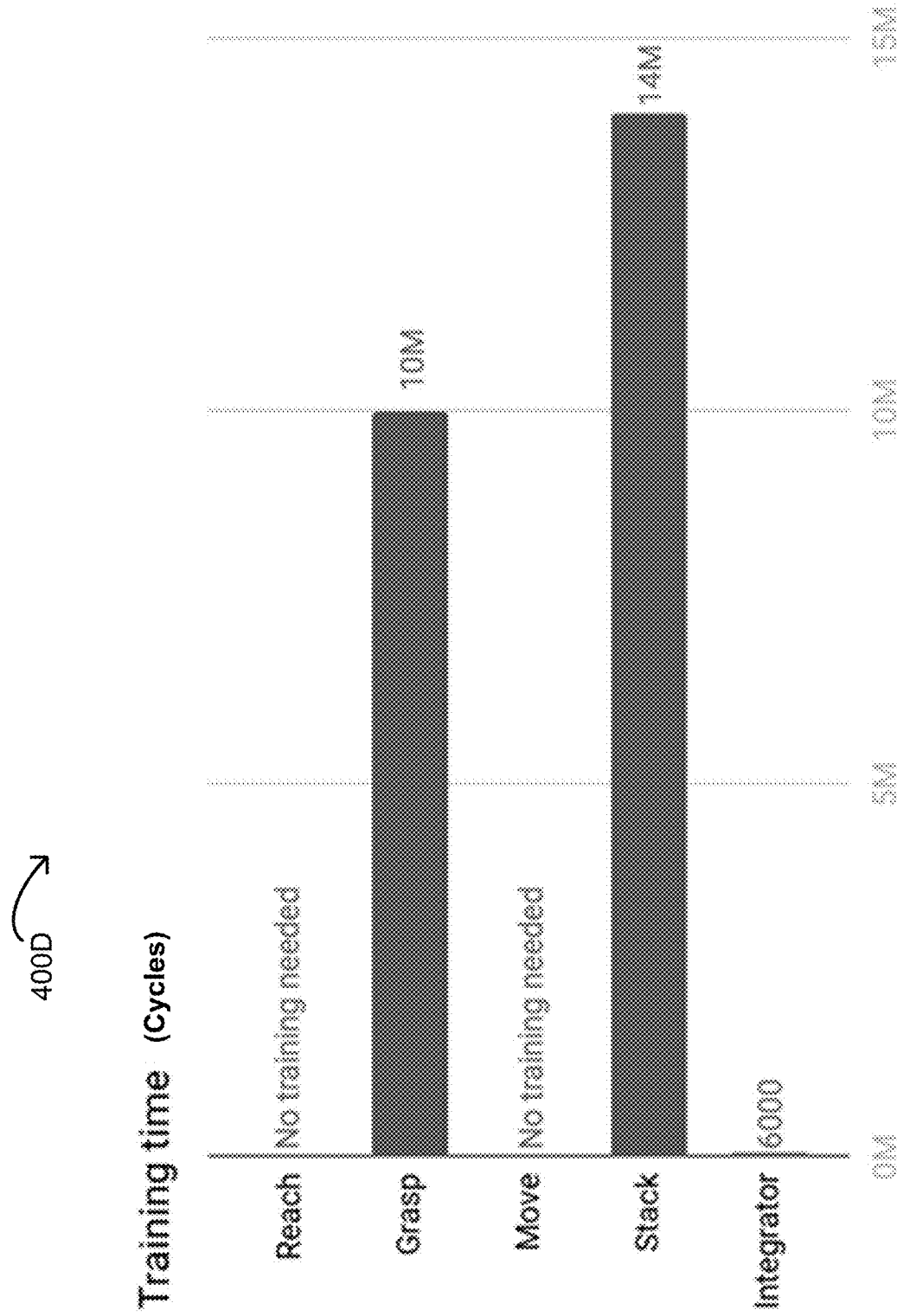

```
                              ( Start )
                                  │
                                  ▼
```

| The AI engine may be configured to choose from a library of algorithms to use when automatically assembling and building different learning topologies to solve different concepts making up a resulting AI model.     2 |
|---|

```
                                  │
                                  ▼
```

| The AI engine may be configured to integrate both i) one or more dynamic programming training algorithms as well as ii) one or more policy optimization algorithms to build the different learning topologies to solve the different concepts contained with an AI model in order to solve a wide variety of problem types. Each concept contained in the AI model then can use a most appropriate approach for achieving a mission of that concept. For example, a learning topology representing a first concept may be built by the module with a dynamic programming training algorithm, while a learning topology representing a second concept in the same AI model may be built by the module with a policy optimization algorithm.     4 |
|---|

```
                                  │
                                  ▼
```

| The AI engine may be configured to be responsible for creating and optimizing the different learning topologies (e.g. neural networks, decision trees, etc.) and learning algorithms based on i) one or more mental models and ii) one or more reference databases of problem types as well as corresponding learning topologies and algorithms that have been previous productive in solving similar and/or analogous problem types. The hyper learner process in the architect module may be configured to take in a codified mental model and its pedagogy. The module may be configured to then propose a set of candidate learning algorithms, learning topologies, and previous productive configurations that the hyper learner process in the architect module believes will be best able to learn that concept in the AI model. The module may be configured to choose the most appropriate algorithm for that concept based on heuristics including a type of problem trying to be solved as well as a type of data expected to be utilized in that concept.     6 |
|---|

```
                              ┌─ Cont. ─┐
                              └────┬────┘
┌─────────────────────────────────────────────────────────────────────────┐
│ The modules of the AI engine internally as part of the compilation process produces an │
│ intermediary representation of a machine learning model using a model description │
│ language, where the model description language provides a coarse-level description of │
│ the AI model that may be later used to instantiate in a particular framework, and when │
│ generating the different concepts in the AI model to solve, then the architect module │
│ generates proposed model description language descriptors, which are then │
│ instantiated as needed.                                               8 │
└─────────────────────────────────────────────────────────────────────────┘
                                     ↓
┌─────────────────────────────────────────────────────────────────────────┐
│ The library of algorithms contains the learning algorithms. The first dynamic │
│ programming training algorithm may consisting of i) Q-learning with a Q-table, ii) a │
│ Deep Q-Network, and iii) any combination of both while the first policy optimization │
│ algorithm may consisting of i) a Trust Region Policy Optimization (TRPO), ii) a Trust │
│ Region Policy Optimization with a Generalized Advantage Estimation (TRPO-GAE) │
│ algorithm, iii) a Deep Deterministic Policy Gradients (DDPG), and iv) any combination │
│ of these.                                                            10 │
└─────────────────────────────────────────────────────────────────────────┘
                                     ↓
┌─────────────────────────────────────────────────────────────────────────┐
│ The module may be configured to analyze a number of different parameters when │
│ selecting which algorithm to use for the learning topology making up that concept in │
│ the AI model. For example: │
│ 1) where when the problem to be solved by the second concept can be done with │
│ policy only, then the architect module may be configured to select either a Trust │
│ Region Policy Optimization (TRPO) algorithm or a Trust Region Policy Optimization │
│ with a Generalized Advantage Estimation algorithm (TRPO-GAE) to build the learning │
│ topology of the second concept. │
│ 2) where when the architect module analyzes factors of the concept to be learned │
│ potentially needs to unlearn bad behavior, then the architect module uses a TRPO │
│ algorithm in combination with a Delta network to i) extend functionality for robotics as │
│ well as ii) this gives the AI model undergoing training an ability to unlearn bad │
│ behavior. │
│ 3) when the concept consists of just state actions or discrete state changes, then the │
│ architect module may be configured to select a Q-table or a Deep Q-Network algorithm │
│ to build the learning topology of the first concept.                 12 │
└─────────────────────────────────────────────────────────────────────────┘
                              ┌─ Cont. ─┐
                              └─────────┘
```

4) when the architect module analyzes parameters of continuously changing actions or state data, then the architect module will select a Deep Deterministic Policy Gradient (DDPG) algorithm or a TRPO algorithm to build the learning topology in the second concept.

5) when the architect module analyzes parameters of the problem to be solved may be an off policy problem, where an off policy problem can be solved by observing other data than coming from out of the algorithm itself, then the architect module may be configured to select a DDPG algorithm to build the learning topology in the second concept.

6) The topology of the first concept may be built with the first dynamic programming training algorithm, which may be Q-learning with a Q-table, while the topology of the second concept in the AI model may be built with a first policy optimization algorithm, which may be a Trust Region Policy Optimization with a Generalized Advantage Estimation (TRPO-GAE) algorithm, for reinforcement learning solutions for the first concept and the second concept.

<u>12</u>

```
                          ┌─── End ───┐
```

FIG. 12C

ARTIFICIAL INTELLIGENCE ENGINE HAVING VARIOUS ALGORITHMS TO BUILD DIFFERENT CONCEPTS CONTAINED WITHIN A SAME AI MODEL

CROSS-REFERENCE

This application is continuation-in-part of U.S. patent application Ser. No. 15/417,056 titled "An artificial intelligence engine configured to work with a pedagogical programming language to train one or more trained artificial intelligence models," filed Jan. 26, 2017, which claims the benefit of U.S. Provisional Application No. 62/287,861, filed Jan. 27, 2016, titled "Bonsai platform, language, and tooling," each of which is incorporated herein by reference in its entirety. U.S. patent application Ser. No. 15/417,056 was issued as U.S. Pat. No. 10,671,938 B2 on Jun. 2, 2020. This application also claims the benefit under 35 USC 119 of U.S. Provisional Application No. 62/547,339, titled "An artificial intelligence engine having multiple improvements," filed Aug. 18, 2017, which is also incorporated herein by reference in its entirety. This application also claims the benefit under 35 USC 119 of U.S. Provisional Application No. 62/555,584, titled "An artificial intelligence engine having multiple improvements," filed Sep. 7, 2017, which is also incorporated herein by reference in its entirety.

NOTICE OF COPYRIGHT

A portion of the disclosure of this patent application contains material that is subject to copyright protection. The copyright owner has no objection to the facsimile reproduction by anyone of the material subject to copyright protection as it appears in the United States Patent & Trademark Office's records for this application, but otherwise reserves all copyright rights whatsoever.

FIELD

Embodiments of the design provided herein generally relate to an Artificial Intelligence ("AI") engine using a hierarchical-decomposition deep reinforcement technique to train and assemble an AI model.

BACKGROUND

Deep reinforcement learning yields great results for a large array of problems, but AI models are generally retrained anew for each new problem to be solved. Prior learning and knowledge are difficult to incorporate when training new AI models, requiring increasingly longer training as problems become more complex. This is especially problematic for problems with sparse rewards.

Learning goal-directed skills is a major challenge in reinforcement learning when the environment's feedback is sparse. The difficulty arises from insufficient exploration of the state space by an agent, and results in the agent not learning a robust policy or value function. The problem is further exacerbated in high-dimensional tasks, such as in robotics. Although the integration of non-linear function approximators, such as deep neural networks, with reinforcement learning has made it possible to learn patterns and abstractions over high dimensional spaces (see Silver, D., et al., 2016 "Mastering the game of go with deep neural networks and tree search," Nature 529, 484-489.; as well as Mnih, V., Kavukcuoglu, et al., 2015, "Human-level control through deep reinforcement learning", Nature 518, 529-533), the problem of exploration in the sparse reward regime is still a significant challenge. Rarely occurring sparse reward signals are difficult for neural networks to model, since the action sequences leading to high reward must be discovered in a much larger pool of low-reward sequences. In addition to the above difficulties, robotics tasks that involve dexterous manipulation of objects have the additional challenge of a trade-off between robustness and flexibility.

In such settings, one natural solution is for the agent to learn, plan, and represent knowledge at different levels of temporal abstractions, so that solving intermediate tasks at the right times helps in achieving the final goal. Sutton et al. [1999] provided a mathematical framework for extending the notion of "actions" in reinforcement learning to "options", which are policies taking a certain action over a period of time, (Sutton, R. S., Precup, D., Singh, S., 1999, "Between mdps and semi-mdps: A framework for temporal abstraction in reinforcement learning," Artificial Intelligence 112, 181-211).

Another problem is the total amount of time it takes to train an AI model on a task just to experiment to see if learning that task up to an acceptable level is even possible.

Some approaches have a person scripting code to train an AI model verses a module. Likewise, some approaches have a person scripting code to instantiate AI objects for an AI model.

SUMMARY

In general, methods and apparatuses are described. In an embodiment, the AI engine may provide one or more user interfaces for one or more users in a user's organization to supply information to and/or receive information from multiple independent modules in the AI engine. The AI engine has a first module that chooses from a library of algorithms to use when automatically assembling and building different learning topologies to solve different concepts making up a resulting AI model. The AI engine may integrate both i) one or more dynamic programming training algorithms as well as ii) one or more policy optimization algorithms, to build the different learning topologies to solve the different concepts contained with an AI model in order to solve a wide variety of problem types. Each concept contained in the AI model then can use a most appropriate approach for achieving a mission of that concept. A learning topology representing a first concept can be built by the first module with a first dynamic programming training algorithm, while a learning topology representing a second concept in the same AI model can be built by the first module with a first policy optimization algorithm.

These and other features of the design provided herein can be better understood with reference to the drawings, description, and claims, all of which form the disclosure of this patent application.

DRAWINGS

The drawings refer to an embodiment of the design provided herein in which:

FIG. 1A provides a block diagram illustrating an AI system and its cloud-based computing platforms infrastructure in accordance with an embodiment.

FIG. 1B provides a block diagram illustrating an AI system and its on-premises based computing platforms infrastructure in accordance with an embodiment.

FIGS. 2A and 2B provide block diagrams illustrating an embodiment of AI system with an AI engine that choose from a library of algorithms to use when automatically assembling and building different learning topologies to solve different concepts making up a resulting AI model.

FIG. 3A illustrates a block diagram of an embodiment of a concept in a mental model that receives input data from a data source, computes its function, and generates output data.

FIG. 3B also illustrates a block diagram of an embodiment of a concept in a mental model that receives input data from a data source, computes its function, and generates output data.

FIG. 4D illustrates a block diagram of an embodiment of a graph of the training of two or more different concepts corresponding to the individual actions in the complex task, in parallel, which the parallel training and simpler reward functions speed up the overall training duration for the complex task on the one or more computing platforms.

Figure 10:
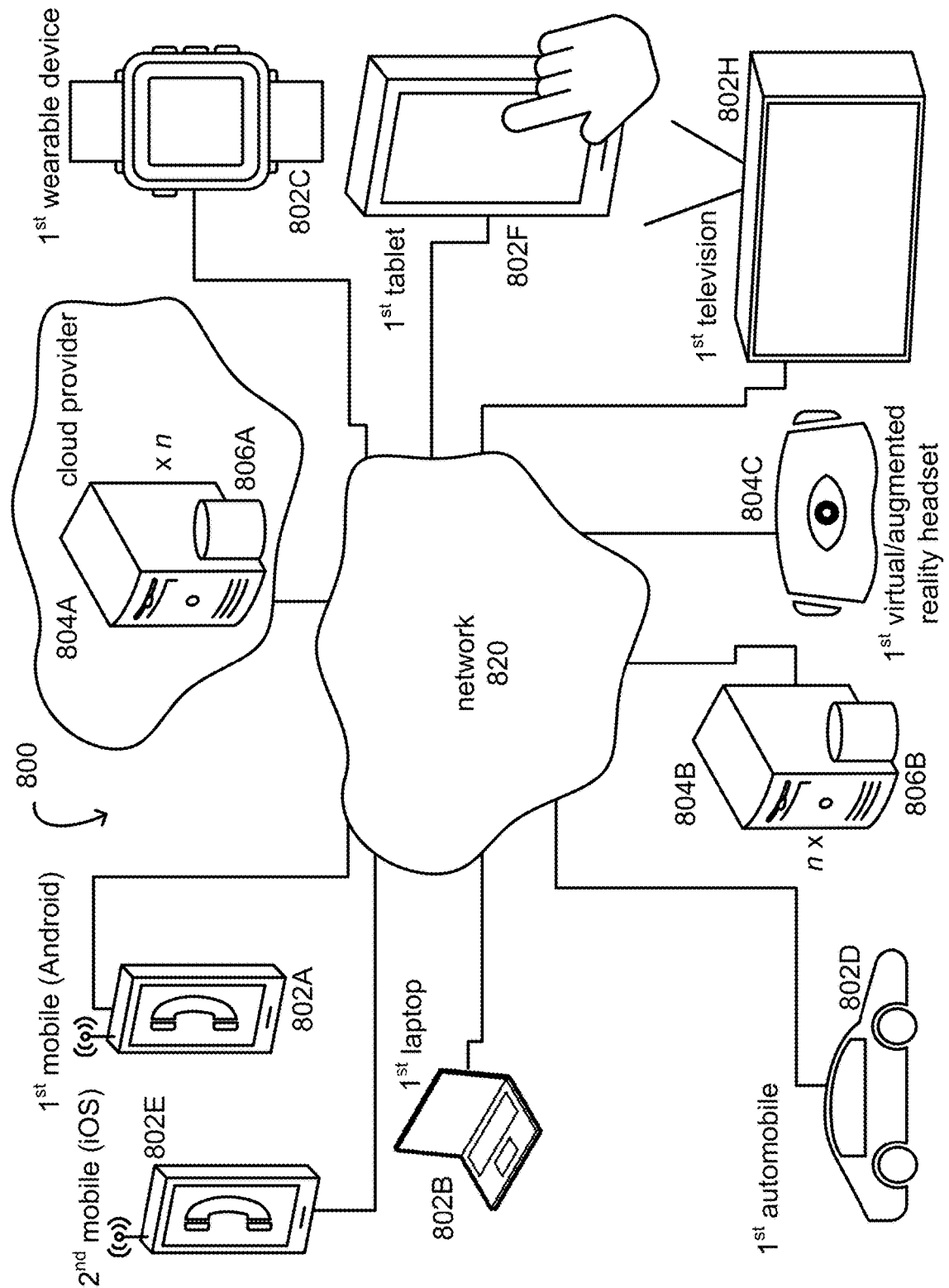

FIG. 10 provides a block diagram illustrating one or more computing systems in accordance with an embodiment.

Figure 11:
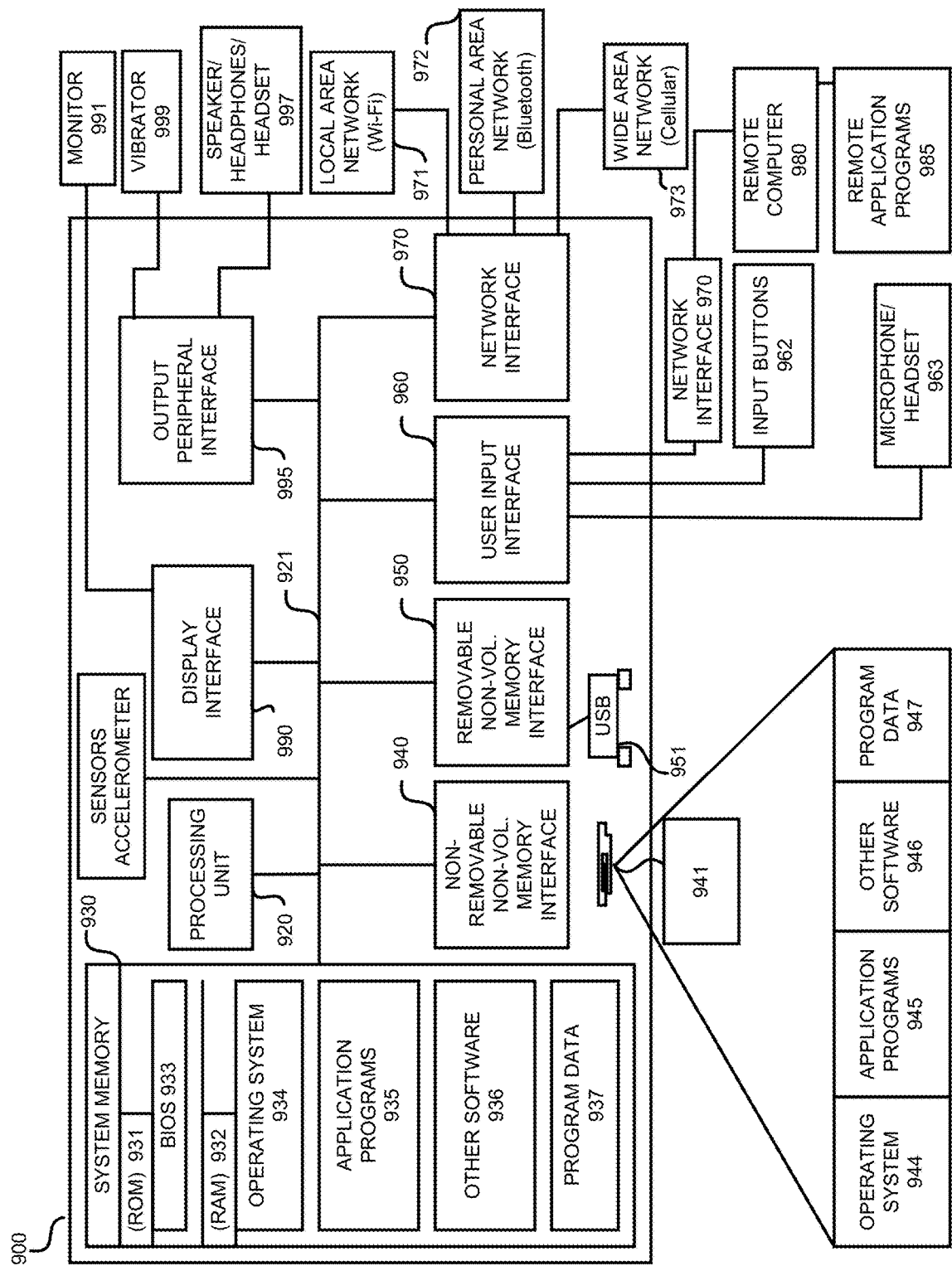

FIG. 11 illustrates a number of electronic systems and devices communicating with each other in a network environment in accordance with an embodiment.

FIGS. 12A through 12C provide flow diagrams illustrating a method for a hierarchical-decomposition deep reinforcement learning for an AI model in accordance with an embodiment.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, modules, etc., in order to provide a thorough understanding of the present design. It will be apparent, however, to one of ordinary skill in the art that the present design can be practiced without these specific details. In other instances, well known components or methods have not been described in detail, but rather in a block diagram in order to avoid unnecessarily obscuring the present design. Further, specific numeric references such as a first module, can be made. However, the specific numeric reference should not be interpreted as a literal sequential order, but rather interpreted that the first module is different than a second module. Thus, the specific details set forth are merely exemplary. Also, the features implemented in one embodiment may be implemented in another embodiment where logically possible. The specific details can be varied from and still be contemplated to be within the spirit and scope of the present design. The term "coupled" is defined as meaning connected either directly to the component or indirectly to the component through another component.

A module, such as a hyper learner process in an architect module, in the AI engine is configured to choose from a library of algorithms to use when automatically assembling and building different learning topologies to solve different concepts making up a resulting AI model. The AI engine may integrate both i) one or more dynamic programming training algorithms as well as ii) one or more policy optimization algorithms to build the different learning topologies to solve the different concepts contained with an AI model in order to solve a wide variety of problem types. Each concept contained in the AI model can use a most appropriate approach for achieving a mission of that concept. A learning topology representing a first concept can be built by the first module with a dynamic programming training algorithm, while a learning topology representing a second concept in the same AI model can be built by the first module with a policy optimization algorithm.

By choosing a proper algorithm, the AI engine will save a significant amount of computing power and cycles compared to computing all of the nodes with a wrong algorithm making up the AI model in each training cycle.

FIGS. 1A-2B and FIGS. 10-11 illustrate example computing infrastructure for an AI engine that may be implemented with the hierarchical-decomposition deep reinforcement learning for an AI model. FIGS. 3A through 9 and FIGS. 12A-12C illustrate example details about the automatically assembling and building of different learning topologies with different algorithms in an AI model. All of the Figures discuss example details of the design discussed herein.

System Overview

Brief Discussion of Components in the AI Engine

Figure 2A:
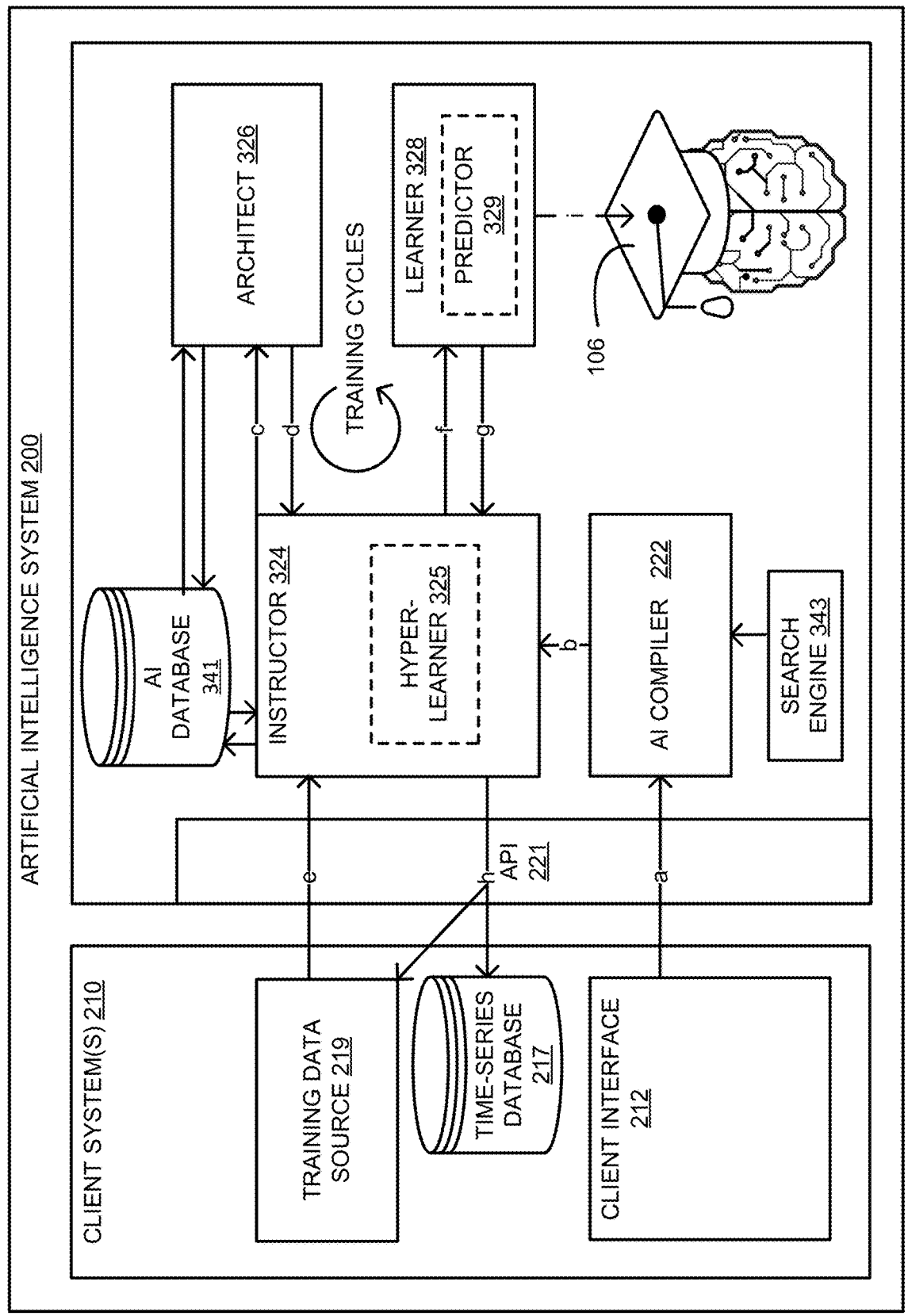

FIGS. 2A and 2B provide block diagrams illustrating an embodiment of AI system with an AI engine that choose from a library of algorithms to use when automatically assembling and building different learning topologies to solve different concepts making up a resulting AI model.

The AI engine for generating a trained AI model 106 can include one or more AI-generator modules selected from at least an instructor module 324, an architect module 326, and a learner module 328 as shown. The instructor module 324 can optionally include a hyperlearner module 325, and which can be configured to select one or more hyper parameters for any one or more of a neural network configuration, a learning algorithm, and the like. The hyperlearner module 325 can optionally be contained in a different AI-generator module such as the architect module 326 or the learner module 328, or the hyperlearner module 325 can be an AI-generator module itself. The learner module 328 can optionally include a predictor module 329, which can provide one or more predictions for a trained AI model. The predictor module 329 can optionally be contained in a different AI-generator module such as the instructor module 324 or the architect module 326, or the predictor module 329 can be an AI-generator module itself. The AI engine including the foregoing one or more AI-generator modules can be configured to generate the trained AI model, such as trained AI model 106, from compiled scripted software code written in a pedagogical software programming language via one or more training cycles with the AI engine.

One or more clients 210 can make a submission to create a trained AI model. Once a Mental Model (see FIGS. 3A and 3B) and curricula have been coded in the pedagogical software programming language, then the code received through the user interface 212 can be compiled and sent to the three main modules, the learner module 328, the instructor module 324, and the architect module 326 of the AI engine for training. One or more user interfaces 212, such a web interface, a graphical user interface, and/or command line interface, will handle assembling the scripted code written in the pedagogical software programming language, as well as other ancillary steps like registering the line segments with the AI engine, together with a single command. However, each module—the AI compiler module 222, the web enabled interface 221 to the AI engine, the learner module 328, etc., can be used in a standalone manner, so if the author prefers to manually invoke the AI compiler module, manually perform the API call to upload the compiled pedagogical software programming language to the modules of the AI engine, etc., they have the flexibility and freedom to do so.

Thus, one or more clients 210 can send scripted code from a coder or another user interface 212 to the AI compiler 222. The AI compiler 222 compiles the scripted software code written in a pedagogical software programming language. The AI compiler 222 can send the compiled scripted code, similar to an assembly code, to the instructor module 324, which, in turn, can send the code to the architect module 326. Alternatively, the AI compiler 222 can send the compiled scripted code in parallel to all of the modules needing to perform an action on the compiled scripted code. The architect module 326 can propose a vast array of machine learning algorithms, such as various neural network layouts, as well as optimize the topology of a network of intelligent processing nodes making up an AI object. The architect module 326 can map between concepts and layers of the network of nodes and send one or more instantiated AI objects to the learner module 328. Once the architect module 326 creates the topological graph of concept nodes, hierarchy of concepts feeding parameters into that complex task (if a hierarchy exists in this layout), and learning algorithm for each of the complex task and concepts, then training by the learner module 328 and instructor module 324 may begin. Note, additional ways for the architect module 326 to create the topology of a concept are discussed in more detail later on.

The instructor module 324 can request training data from a training data source 219. Training can be initiated with an explicit start command in the pedagogical software programming language from the user to begin training. In order for training to proceed, the user needs to have already submitted compiled pedagogical software programming language code and registered all of their external data sources such as simulators (if any are to be used) via the user interfaces with the learner and instructor modules 324, 326 of the AI engine.

The training data source 219 can send the training data to the instructor module 324 upon the request. The instructor module 324 can subsequently instruct the learner module 328 on training the AI object with pedagogical software programming language based curricula for training the concepts into the AI objects. Training an AI model can take place in one or more training cycles to yield a trained state of the AI model 106. The instructor module 324 can decide what pedagogical software programming language based concepts and streams should be actively trained in a mental model. The instructor module 324 can know what are the terminating conditions for training the concepts based on user criteria and/or known best practices. The learner module 328 or the predictor 329 can elicit a prediction from the trained AI model 106 and send the prediction to the instructor module 324. The instructor module 324, in turn, can send the prediction to the training data source 219 for updated training data based upon the prediction and, optionally, instruct the learner module 328 in additional training cycles. When one or more training cycles are complete, the learner module 328 can save the trained state of the network of processing nodes in the trained AI model 106. (Note a more detailed discussion of different embodiments of the components making up the AI engine also occurs later on.)

The AI engine has multiple independent modules 222, 324, 325, 326, 328, and 329 on one or more computing platforms. The multiple independent modules 222, 324, 325, 326, 328, and 329 have their instructions executed by one or more processors in the one or more computing platforms. The multiple independent modules 222, 324, 325, 326, 328, and 329 may be loaded into one or more memories of the one or more computing platforms.

The instructor module 324 may apply a hierarchical-decomposition deep reinforcement technique to train one or more AI objects corresponding to concept nodes in an AI model 106. The instructor module 324 may use the hierarchical-decomposition deep reinforcement technique to solve a wide variety of a set of complex tasks in a modular way, through hierarchically decomposing a complex task into multiple smaller, individual actions making up the complex task. One or more of the individual actions, correspond to its own concept node in the graph. The AI engine 200 may initially train the AI objects on the individual actions in parallel at the same time and then train on how the individual actions need to interact with each other in the complex task in order to deliver an end solution to the complex task.

The instructor module 324 decomposing the complex task allows the AI engine 200 to use simpler reward functions focused for solving each individual action and then much simpler reward functions focused for the end solution of the complex task. The AI engine 200 decomposing the complex task also allows conducting the training of two or more different concepts corresponding to the individual actions in the complex task, in parallel. The parallel training and simpler reward functions speed up an overall training duration for the complex task and resulting AI model on the one or more computing platforms. The parallel training and simpler reward functions speed up an overall training duration for the complex task compared to an end-to-end training with a single algorithm for all of the AI objects incorporated into the AI model.

Reward functions can be more easily defined by decomposing the complex task. Instead of specifying a complex reward function for solving the whole task, the system designer can define rewards that are specific to each sub-task/concept. These are usually simpler to define. Once the sub-task/concepts are ready, the designer can specify a simpler and potentially sparse reward function for selector nodes. This greatly simplifies solving complex problems with reinforcement learning.

Also, decomposing the complex task allows reusing all or just portions of one or more pre-trained models for solving a new larger complex task.

Also, decomposing the complex task allows each concept making up the complex task in the graph to use the most appropriate training approach for that individual action, whether that be a classical motion controller, a pre-existing learned model, or a neural network that needs to be trained rather than the whole AI model being trained with one of these training approaches.

Also, decomposing the complex task allows replacing one or more concepts making up the complex task without retraining each concept making up that system. For example, in FIG. 4B, the AI model may switch between using different versions of the concepts of a Grasp and/or Stack. The different versions of the concepts of a Grasp and/or Stack can be adapted without having to change or retrain the Reach, Move, or overall integrator concepts.

The AI system may implement a form of deep reinforcement learning with hierarchical decomposition of the complex task into concepts of individual actions in contrast to a standard notion of running a single end-to-end algorithm training.

The AI engine 200 has the user interface 212 presented on a display screen for use by one or more users in a user's organization. The user interface 212 is configured to set the modules in the AI engine to train two or more concept nodes in parallel at the same time. The learner module 328, including a conductor service, may cooperate with one or more data sources to obtain data for training and conduct the training of two or more AI objects corresponding to concept nodes in parallel at the same time.

An "AI model" as used herein includes, but is not limited to, neural networks such as recurrent neural networks, recursive neural networks, feed-forward neural networks, convolutional neural networks, deep belief networks, and convolutional deep belief networks; multi-layer perceptions; decision trees, self-organizing maps; deep Boltzmann machines; and Stacked de-noising auto-encoders.

An "artificial neural network" or simply a "neural network" as used herein can include a highly interconnected network of processing elements, each optionally associated with a local memory. The processing elements can be referred to herein as "artificial neural units," "artificial neurons," "neural units," "neurons," "nodes," and the like, while connections between the processing elements can be referred to herein as "synapses," "weights," and the like. A neuron can receive data from an input or one or more other neurons respectively through one or more weighted synapses, process the data, and send processed data to an output or yet one or more other neurons respectively through one or more other weighted synapses. The neural network or one or more neurons thereof can be generated in either hardware, software, or a combination of hardware and software, and the neural network can be subsequently trained.

A module may consist of one or more processes including one or more services, one or more electronic circuits, or a combination of one or more software processes cooperating with the electronic circuits.

Note, each trained AI model itself can be a collection of trained AI objects corresponding to a complex task, that is attempted to be analyzed and solved by the AI model, where, a set of concepts in a hierarchical structure feed parameters into the complex task. An AI database 341 can index AI objects corresponding to the complex task and the set of concepts making up a given trained AI model so that reuse, recomposition, and reconfiguration of all or part of a trained AI model is possible.

A software process may be an instance of an executable file configured to perform a task in a finite amount of time (i.e., a job). Thus, each process is configured to operate for a finite amount of time to achieve its configured goal and then shut down until invoked again when needed in the future. Several instances of a same process each wrapped in its own container may run simultaneously on one or more computing devices. A service may be a process, which runs in the background. Each independent process is configured to be aware of the existence of the other processes and knows whom to call and what data and types of inputs that other processes look for.

Building Concepts

Referring to FIGS. 2A and 2B, a first module, an architect module 326 with a hyper learner process, in the AI engine 200, 200B may choose from a library of algorithms 341 to use when automatically assembling and building different learning topologies to solve different concepts making up a resulting AI model 106. The AI engine 200, 200B may integrate both i) one or more dynamic programming training algorithms as well as ii) one or more policy optimization algorithms to build the different learning topologies to solve the different concepts contained with an AI model 106 in order to solve a wide variety of problem types. Each concept contained in the AI model 106 then can use a most appropriate approach for achieving a mission of that concept. A learning topology representing a first concept can be built by the first module with a first dynamic programming training algorithm, while a learning topology representing a second concept in the same AI model 106 can be built by the first module with a first policy optimization algorithm. Likewise, each concept can be evaluated and then the architect module may build the topology that will be the best at accomplishing that concept. The AI engine may also integrate existing pre-trained concepts as well as classical controllers for other concepts all integrated into a resulting AI model.

In an embodiment, the first module is an architect module 326 with a hyper learner process. The hyper learner process in the architect module 326 may be responsible for creating and optimizing the different learning topologies (e.g. neural networks, decision trees, etc.) and learning algorithms based on i) one or more mental models and ii) one or more reference databases 341 of problem types as well as corresponding learning topologies and algorithms that have been previous productive in solving similar and/or analogous problem types. The hyper learner process in the architect module 326 may take in a codified mental model and its pedagogy. The hyper learner process in the architect module 326 may then propose a set of candidate learning algorithms, learning topologies, and previous productive configurations that the hyper learner process in the architect module 326 believes will be best able to learn that concept in the AI model 106.

The AI engine 200, 200B can obtain parameters to classify an algorithm and breakdown for regression classification. Also, included is 'How does the AI engine 200, 200B get a learning system that learns to learn in place.' The AI engine 200, 200B may employ its own machine learning model to learn how to build a learning system. The first module references and manages complex machine learning libraries and algorithms.

The library of algorithms 341 contains the learning algorithms. The dynamic programming training algorithms may consist of i) Q-learning with a Q-table, ii) a Deep Q-Network (DQN), and iii) any combination of both. The policy optimization algorithms may consist of i) a Trust Region Policy Optimization (TRPO), ii) a Trust Region Policy Optimization with a Generalized Advantage Estimation (TRPO-GAE) algorithm, iii) a Deep Deterministic Policy Gradients (DDPG), and iv) any combination of these. The dynamic programming training algorithms may involve storing partial solutions to problems, so that a solution that has already been found can be retrieved rather than being recomputed. The policy optimization algorithms may learn a policy directly, and adjust the policy based on observations to make higher rewards more likely. For example, a Deterministic Policy Gradient may compute the policy gradients using the derivative between the output of a critic function and the policy parameters. By approximating the critic and policy functions using Neural Networks, one can solve continuous action spaces. A TRPO algorithm may maximize the monotonic improvement term with a stochastic policy constraint, in which the policy gradient is estimated.

The dynamic programming training algorithms may include i) Q-learning with a Q-table and ii) DQN. Q-learning may be a reinforcement learning technique used in machine learning that does not require a model of the environment. Q-learning can be used to find an optimal action-selection policy for any given (finite) Markov decision process (MDP). It works by learning an action-value function that ultimately gives the expected utility of taking a given action in a given state and following the optimal policy thereafter. A policy can be a rule that the agent follows in selecting actions, given the state it is in. When such an action-value function is learned, the optimal policy can be constructed by simply selecting the action with the highest value in each state. One of the strengths of Q-learning is that it is able to compare the expected utility of the available actions without requiring a model of the environment. Additionally, Q-learning can handle problems with stochastic transitions and rewards, without requiring any adaptations. Q-learning at its simplest uses tables to store data. Note, DQN may be an extended framework of the Q-Learning algorithm with an approximation of the critic function using deep neural networks. Similar to Q-Learning, DQN may solve the reinforcement learning problem via maximizing a solution that satisfies a particular equation. With random initialization, a Q function iteratively updates using the equation converges to the optimal solution via exploration on state and action. DQN may approximate the Q function with a neural network, with the policy converging toward the optimal solution via periodic updates to the parameters of the approximate Q function.

In an embodiment, the first module may choose the most appropriate algorithm for that concept based on heuristics including a type of problem trying to be solved as well as a type of data expected to be utilized in that concept. For example, many heuristics regarding the mental model can be used to inform what types of AI and machine learning algorithms to use. For example, the data types used can have a large influence. For this reason, pedagogical programming language, such as Inkling™, available from Bonsai AI, Inc. of Berkeley, Calif., contains rich native data types in addition to the basic data types. If the architect module 326 sees, for example, that an image is being used (or higher-dimensional representations), a convolutional deep learning neural network architecture may be appropriate. If the architect module 326 sees data that is temporal in nature (for example audio data, or sequence data), then a recursive deep learning neural network architecture like a long short-term memory ("LSTM") network may be more appropriate. The collection of heuristics is generated by i) data science, ii) machine learning and/or iii) an AI expert's input who works on the architect codebase and who attempts to capture the heuristics that they use in practice.

The architect module 326 may be configured to analyze a number of different parameters when selecting which algorithm to use for the learning topology making up that concept in the AI model 106. For example:

1) where when the problem to be solved by the second concept can be done with policy only, then the architect module 326 may be configured to select either a TRPO algorithm or a TRPO-GAE to build the learning topology of the second concept. The TRPO-GAE can maximize a monotonic improvement term with a stochastic policy constraint, in which the policy gradient is estimated. The TRPO-GAE algorithms improved learning stability and accuracy, faster convergence speed, it yields more accurate training results on a wide variety of reinforcement learning tasks with little tuning on hyper parameters.

2) where when the architect module 326 analyzes factors of the concept to be learned potentially needs to unlearn bad behavior, then the architect module 326 uses a TRPO algorithm in combination with a Delta network to i) extend functionality for robotics as well as ii) this gives the AI model 106 undergoing training an ability to unlearn bad behavior. The system can then have a selector inserted on how to train with the TRPO algorithm. For example, with training with robotics, a mixture of training with a delta network and a TRPO algorithm works well for training robotics. The Delta network and TRPO algorithm can complement each other.

3) when the concept consists of just state actions or discrete state changes, then the architect module 326 may be configured to select a Q-table or a DQN algorithm to build the learning topology of the first concept.

4) when the architect module 326 analyzes parameters of continuously changing actions or state data, then the architect module 326 will select a DDPG algorithm or a TRPO algorithm to build the learning topology in the second concept.

5) when the architect module 326 analyzes parameters of the problem to be solved may be an off policy problem, where an off policy problem can be solved by observing other data than coming from out of the algorithm itself, then the architect module 326 may be configured to select a DDPG algorithm to build the learning topology in the second concept.

6) The topology of the first concept may be built with the first dynamic programming training algorithm, which may be Q-learning with a Q-table, while the topology of the second concept in the AI model 106 may be built with a first policy optimization algorithm, which may be a Trust Region Policy Optimization with a Generalized Advantage Estimation (TRPO-GAE) algorithm, for reinforcement learning solutions for the different concepts.

These and many other examples are possible. Each concept, the first, second, third, fourth, etc. may have its own algorithm.

In an embodiment, the first module may support i) dynamic programming training algorithms including Q-Tables, DQNs, and other similar algorithms, as well as ii) policy optimization algorithms including DDPG, TRPO with GAE, as well as other similar algorithms as the AI engine 200, 200B's primary reinforcement-learning solutions. In a multi-concept codified file, the architect module 326 may mix-and-match solutions depending on the complexity of concepts.

The modules of the AI engine 200, 200B internally as part of the compilation process produce an intermediary representation of a machine learning model using a model description language, where the model description language provides a coarse-level description of the AI model 106 that is later used to instantiate in a particular framework (such as Tensor flow), and when generating the different concepts in the AI model 106 to solve, then the architect module 326 generates proposed model description language descriptors, which are then instantiated as needed.

Independent Processes of the AI Engine Running on its Own Computing Device

Each of the independent process in a module can be running its own computing device (e.g., see FIGS. 1A & 1B 709A-711A), and then use a subnet to communicate communications between the other independent processes. As capacity exists, some independent processes may share a computing device. Also, using the subnets is much faster than, for example trying to conduct communications through the Internet via the Gateway, which would have a longer round-trip delay time or lag time.

Individual processes programmed to achieve and perform different functions within the AI engine are broken up into an individual process, each in its own software container. For example, 1) the architect process can be configured to create, instantiate, and figure out the topology of an AI model corresponding to a concept being trained for AI, 2) an instructor process can be configured to guide the training and how to do the training, and 3) a learner process to carrying out an actual execution of the training, as well as 4) a predictor process, during an AI models deployment, to make use of a trained AI model. Breaking these up into individual processes/modules that are aware of each other and know which process and/or service to call and how to call that process and also know which inputs and outputs to send to each other, allows the training to be broken up into these multiple discrete individual services.

Each process is configured as an independent process wrapped in its own container so that multiple instances of the same processes, (e.g.) learner and instructor, may be running simultaneously to scale to handle multiple users running training sessions, deploying AI modules, and creating AI models, all at the same time. Thus, the cloud or on-premises platform for the AI engine exists with servers, processes, and databases, that allows many users to connect over a wide area network, such as the Internet, from multiple computing devices and then the backend of the cloud platform is configured to handle the scaling, efficiency, etc., by dynamically calling in additional computing hardware machines to load on and run the independent processes of, for example, an instance of the learner and/or instance of the instructor, as needed.

Concepts and Mental Models

Figure 3A:
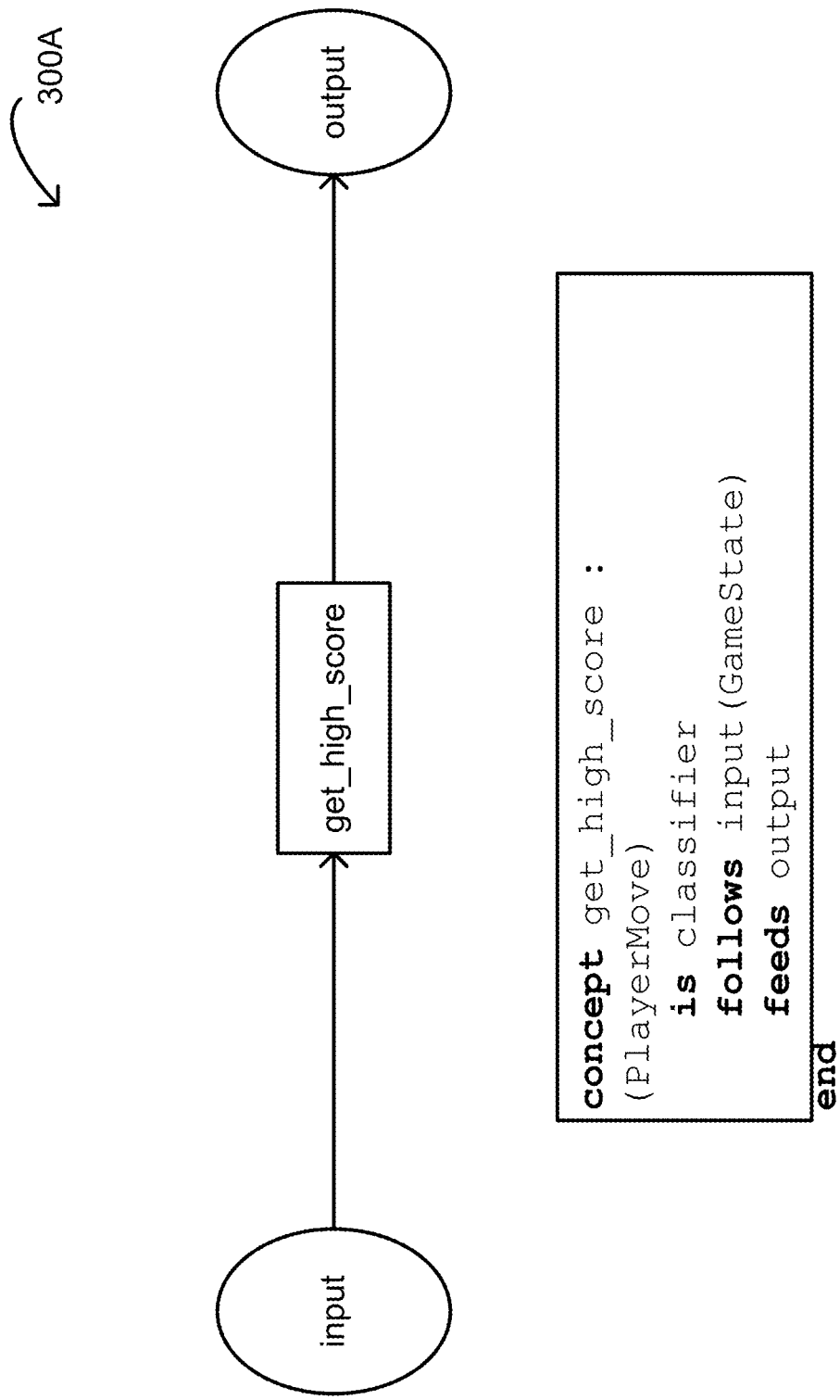
Figure 3B:
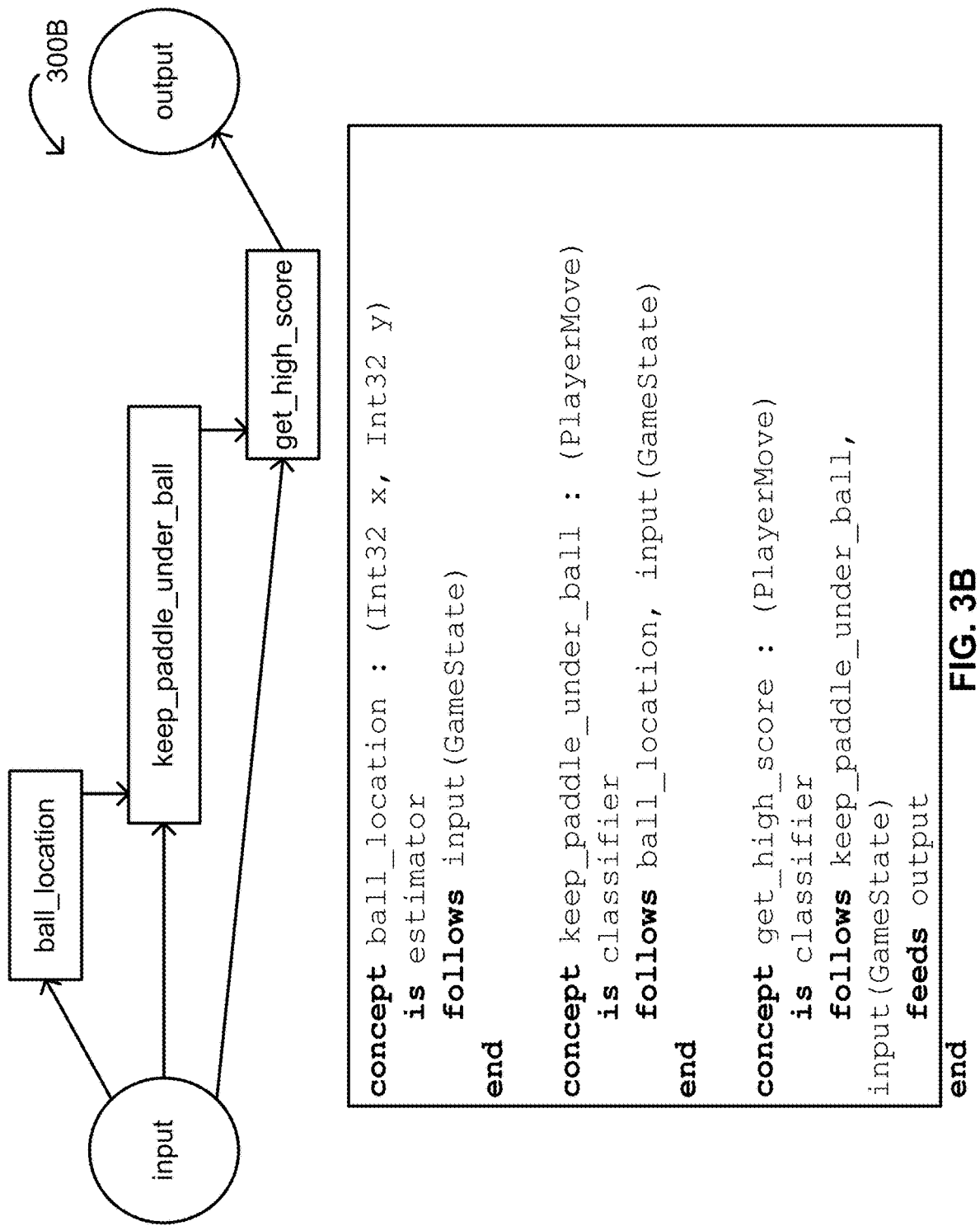

FIGS. 3A and 3B provide block diagrams of an embodiment of a concept in a mental model 300A, 300B that receives input data from a data source, computes its function, and generates output data.

Pedagogical programming focuses on codifying two main pillars: 1) What are the concepts associated with the problem domain (and mentally how do they relate to each other)? and 2) How would one go about teaching those concepts?

A concept is something that can be learned. Once learned, its corresponding AI object can provide an intelligent output. An AI object may learn and be trained on a particular concept. An AI object corresponding to a particular concept can receive input data from other AI objects/concepts and simulators, and send output data to other AI objects/concepts or as an AI object corresponding to a complex task produce a final result/output. A concept can be used in isolation, but it is typically more useful to construct some structured relationship of connectivity, such as a hierarchy, between the related concepts, beginning with the relatively simple concepts and then building into more complex concepts. For example, "ball location" is a relatively simple concept; whereas, "get high score" with the ball is a more complex task. In another example, a mental model of flying a plane may have a complex task of "flying a plane" and numerous concepts such as "how to navigate and move a plane from point A to point B," "how to avoid crashing into objects," "how to take off into flight', 'how to land from flight," etc. Each of the concepts feeds one or more outputs either directly or indirectly into the complex task of "flying a plane" when undergoing training on the complex task. The architect module 326 creates the structured relationship of connectivity between these concepts based on user supplied guidance in the pedagogical programming language code.

Thus, concepts are distinct aspects of a complex task that can be trained separately, and then combined using an integrator concept. This approach drastically reduces the overall complexity, since the simpler problems can be trained with focused and easier-to-specify reward functions. In addition, the selected concept can be quickly learned using a simple reward function. Each discrete AI object making up an AI model may be encoded or containerized into its own new concept node and that set of concept nodes is put into a graph of concept nodes. The graph of nodes may be intermixed with concept nodes that are new and extend the functionality of the initial machine-learning model. (See example FIGS. 4A-4F.)

A concept in a pedagogical programming language may be something that an AI object can be trained on and learn. In an embodiment, a concept can describe things such as an object, a ball, a character, an enemy, a light, a person, or the like. The state data can be whether the one or more things are on or off, hot or cold, a number or a letter, or the like. Other example concepts can reflect a method or a behavior such as "avoid ghosts," "keep the paddle under the ball," "don't run into walls," "turn lights off," "get high score," or the like. Both FIGS. 3A and 3B show mental models including the strategy-type concept "get high score."

A mental model in a pedagogical programming language is also something that an AI model can be trained on and learn. A mental model can include one or more concepts structured in terms of the one or more concepts, and the mental model can further include one or more data transformation streams. As shown in FIG. 3A, a single-concept mental model can include, for example, a strategy-type concept such as "get high score." As shown in FIG. 3B, a multi-concept mental model can include a hierarchical structure including, for example, strategy-type concepts such as "keep paddle under ball" and "get high score" and fact-type concepts such as "ball location." The concepts of "keep paddle under ball" and "ball location" feed parameters directly or indirectly into the complex task of "get high score" with the ball. Each AI object in a multi-concept mental model can receive input from other AI objects corresponding to other concepts in the mental model, send output to other concepts in the mental model, provide a final output or result output, or a combination thereof. Addition of more concepts to a mental model can decrease training time for an AI object, as well as enable a trained AI object to give smarter, more accurate predictions. Each trained concept may be AI object. Given this choice of mental model frames, the system would then codify the underlying concepts and their relationships in a corresponding network of AI objects.

Hierarchical Reinforcement Learning

Figure 4A:
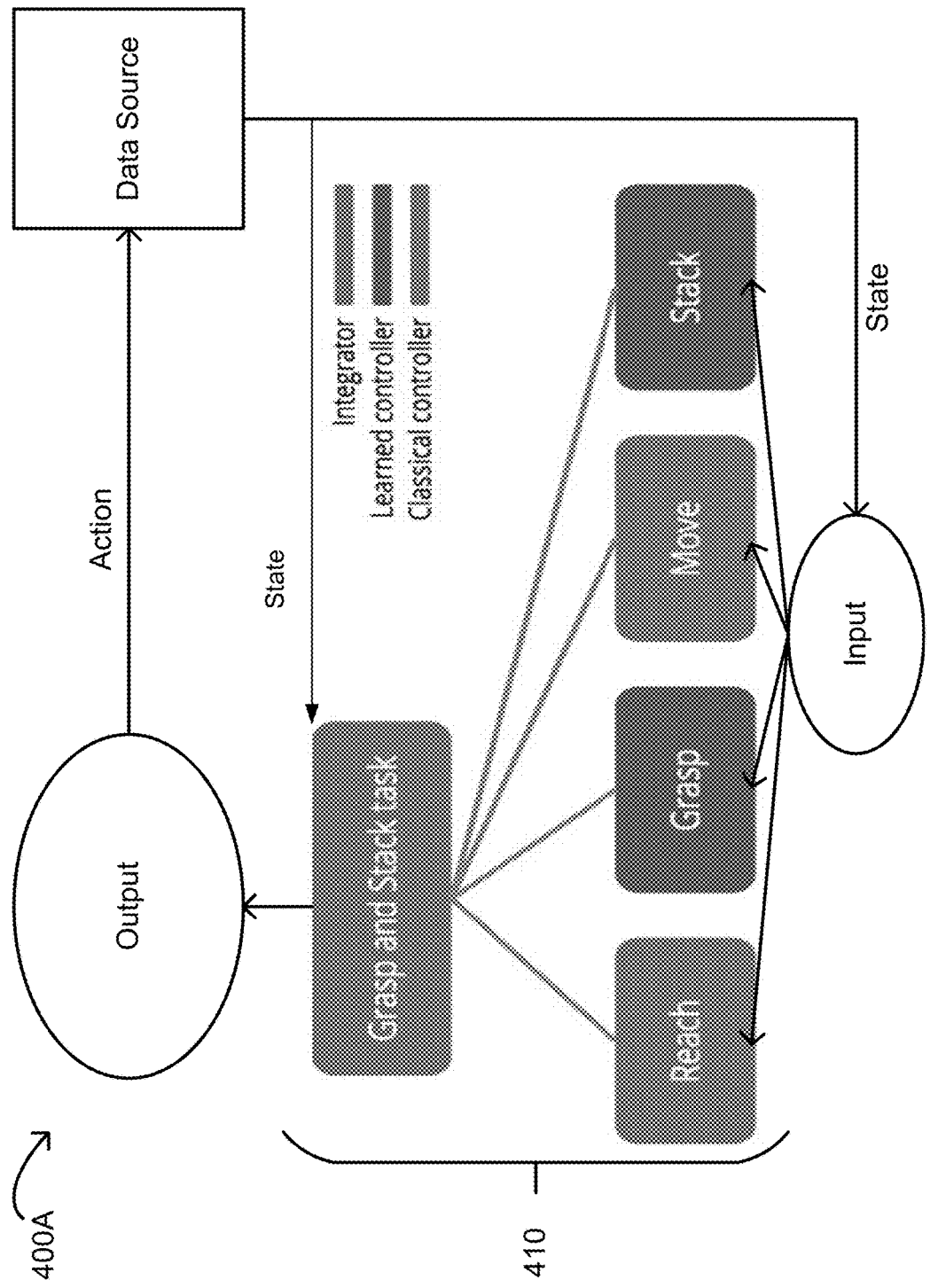
FIG. 4A illustrates a block diagram of an embodiment of a complex task with multiple smaller, individual actions making up the complex task, and the individual actions correspond to its own AI object in the concept network.

FIG. 4A illustrates a block diagram of an embodiment of a complex task with multiple smaller, individual actions making up the complex task, and the individual actions correspond to its own AI object in the concept network.

The modules of the AI engines decompose complex tasks into smaller, individual actions 410. The complex task; and thus, complex learning problem can be broken down into concepts, each concept learned independently, then reassembled into a complete solution to the complex task. The modules of the AI engine can initially break an example overall task of Grasp-n-Stack down into four concepts: 1) Reach the object, 2) Grasp the object, 3) Move, and 4) Stack the object in a Stack. In this example robotic control demonstration, the complex task was decomposed by the modules into a concept network of five concepts: Reach for the object, Grasp the object, Move the object, Stack the object, and the integrated Grasp-n-Stack task. (See FIG. 4E for an example illustration). Each concept has its own corresponding AI object being trained.

The concept network reinforcement learning approach has many benefits, as well as some limitations. Perhaps the greatest benefit is the ability to truly decompose reinforcement learning problems into independent parts. Developers can hierarchically decompose complex tasks into smaller increments. This is crucial for applying reinforcement learning to real industrial problems, allowing teams to divide and conquer: i) different groups can independently work on different aspects of a learning problem, ii) quickly assemble them into a full solution for the complex task, and iii) later upgrade individual components later without needing to retrain the entire set of concepts making up the complex task. The concept network reinforcement learning framework enables true problem decomposition for reinforcement learning problems. A complex learning problem can be broken down into concepts, each concept learned independently, then reassembled into a complete solution. Decomposing problems in this way can greatly reduce the amount of training needed to achieve a useful result.

In general, reinforcement learning can be about an AI concept interacting with the environment over time, learning an optimal policy, by trial and error with evaluated feedback, for sequential decision making problems. A deep neural network can be combined with reinforcement learning for the deep reinforcement learning. The AI model learns by way of, for example, a dataset, a cost/loss function, and an optimization procedure. A machine learning algorithm can be designed to make gaps between training errors and testing error small. An AI model, such as a neural network, can include input and output layers. At each layer except the initial input layer, the system can compute the input to each unit, as a weighted sum of units from the previous layer. A map of a set of input values to output values can be generated. The system may implement a form of deep reinforcement learning in contrast to a standard notion of running a single end-to-end algorithm training, which saves computing duration to train the AI model compared to the single end-to-end algorithm training. In the deep reinforcement learning, the AI concept interacts with an environment over time. In an embodiment, at each time step (e.g., iteration of learning), the AI concept receives a state in a state space, selects an action from an action space, follows a policy, which controls the AI concept's behavior, i.e., a mapping from a state to actions, then receives a scalar reward, and then transitions to the next state, according to the environment dynamics, or model, for the reward function. (See FIG. 6 for example.) The AI concept also receives feedback from its selected actions and performance and then evaluates the feedback to alter its training. Each concept can have different state+action spaces.

Reinforcement learning may be a branch of machine learning inspired concerned with how software agents ought to take actions in an environment so as to maximize some notion of cumulative reward. The basic idea of reinforcement learning is to obtain a policy that extract more reward from the environment by picking actions given a state. By policy, we mean a decision maker (Agent) that decide on an action based on some parameterized rules given an input observation of environment (State). The policy can be a set of weights that linearly combine the features in a state or different structured Neural Network. The environment in reinforcement learning context provide the agent a new state and reward immediately after the agent takes a specific action. For reinforcement learning, it is more close to supervised learning, while its label is obtained by exploring the environment and get feedback (reward) from it. The reinforcement learning algorithm marks the policy that generates the highest score as the training target and make small change of its parameters (or weights) towards that policy until the policy converge. At each time step, the process is in a state s, and the decision maker may choose any action A in state S. The process in the next time step will moving into a new state, and giving the decision maker a corresponding reward. The reward is an evaluation of the action, it is always related to performance.

Referring to FIG. 2A, the AI engine 200 may employ Hierarchical Reinforcement Learning (HRL) to benefit from multiple levels of decision making. HRL allows the AI engine 200 to train each individual concept with an appropriate algorithm to solve that concept, and then train the entire complex task to combine the concepts to deliver an end solution with potentially another algorithm. By combining concept networks within HRL, the AI engine 200 is able to train on and solve the ultimate complex task orders of magnitude faster than alternate approaches.

The architect module 326 may instantiate the AI objects corresponding to the concepts of the complex/main task into the graph of i) a concept node corresponding to an integrator and ii) one or more levels of concepts corresponding to the individual actions that hierarchically stem forth from the integrator in the graph of the AI model. (See FIG. 4A, for example.) The integrator concept node integrates an interaction between the individual actions to achieve the end solution of the complex task. (See FIG. 4C, for example.)

The architect module 326 may be configured to automatically partition the individual actions into the concept nodes in the AI model to be trained on in a number of ways. The ways of conveying the partitioning of the individual actions into the concept nodes include but are not limited to: i) how to partition the individual actions is explicitly defined in scripted code by the user, ii) how to partition the individual actions is hinted at by giving general guidance in the scripted code by the user, iii) how to partition the individual actions is interpreted from guidance based on responses from the user to a presented list of questions, and iv) any combination of these three. Also, the user may also explicitly define or just give hints on how many levels of nodes in the graph should be. The architect module 326 then proposes a hierarchical structure for the graph of AI objects making up the AI model. The architect module 326 partitions the individual actions to separately train within that AI model where it makes sense to efficiently train in parallel with each other.

In one case, the AI engine figures out how where to partition, by looking at the state inputs and separating by distinctly discreet sets of state inputs. The architect module 326 analyzes an anticipated output for each action and when the state input is roughly generating the same reward function, then the system says okay, do not partition individual actions into their own concept anymore. The architect module 326 can use artificial intelligence to script i) how to construct and ii) know when concepts need to be divided out and treated as separate concepts. For example, when each action uses a similar reward and is getting the same set of data from the data source, such as a simulator, data generator, database, etc., then those actions can actually be combined into a single concept node.

The user can supply the reward function for each concept or the system, can use auto scripting to recognize problems and supply what the reward should be for each concept, which is distinct from the overall reward for the entire complex task.

The instructor module 324 may cause the AI engine to initially train each individual AI object to solve its individual action and it's corresponding one or more reward functions focused for solving that action. The instructor module 324 may then next use an integrator node to train the set of individual actions in the complex task to combine the concepts of the individual actions to cooperate and work with each other to achieve the complex task. The concept node of the integrator may then use a reward function focused for the end solution to the complex task.

Thus, the architect module 326 lays out, for example, a deep learning neural network for the AI model. The instructor module 324 will then proceed to execute the best available lesson in the curriculum and will stream data to the set of AI objects being trained. Upon deployment, the data source 219 would be able to stream, for example, an image into the AI model 106 and get predictions out. In an embodiment, the low level AI or machine learning algorithmic details need not be codified by a user but rather these low level details can be generated by the architect module 326 by pulling the topology of a given network processing nodes and a best machine learning algorithmic from reference databases.

During training, the instructor module 324 cooperating with the learner module 328 might find that an example training algorithm, such as the TRPO algorithm, has difficulty training one or more of the concepts. The modules may chose other algorithms for training these actor concepts to its corresponding AI object. For example, three of these concepts—Orienting, Moving, and Stacking—may use TRPO and deep reinforcement learning to train, while the Pinching and Reaching concepts can be handled with inverse kinematics. Each concept can use the most appropriate approach for that task, whether a classical motion controller, a pre-existing learned model, or a neural network that needs to be trained.

Thus, an artificial intelligence model with multiple layers of concept nodes can have multiple different algorithms employed within that AI model. For example, a first concept network of nodes is built with a first algorithm, a second concept network of nodes is built with a second algorithm, a third concept network of nodes within that AI model is built by the architect process with a third algorithm, a fourth concept merely uses a pre-existing classical controller, etc. Each concept can use the most appropriate approach for that task, whether a classical motion controller, a pre-existing learned model, or a new neural network, decision tree, etc. that needs to be trained.

Incorporating HRL into Building the AI Model

Again, the architect module 326 can be the component of the system responsible for proposing and optimizing learning topologies (e.g., neural networks, decision trees, etc.), based on a number of factors. The architect module 326 can use mental models, heuristics, mental model signatures, statistical distribution inference, Meta-learning, etc. in its topology and algorithm selection.

The AI engine and the architect module 326 thereof can be configured to heuristically pick an appropriate learning algorithm from a number of machine learning algorithms in one or more databases for training the neural network proposed by the architect module 326. Many heuristics regarding the mental model can be used to inform what types of AI and machine learning algorithms can be used. For example, the data types used have a large influence. For this reason, the pedagogical programming language contains rich native data types in addition to the basic data types. If the architect module 326 sees, for example, that an image is being used, a convolutional deep learning neural network architecture might be appropriate. If the architect module 326 sees data that is temporal in nature (e.g., audio data, sequence data, etc.), then a recursive deep-learning neural network architecture like a long short-term memory ("LSTM") network might be more appropriate. The collection of heuristics can be generated by data science, machine learning, and input from AI experts.

In addition to looking at the mental model, the architect module 326 can also consider the pedagogy provided in the pedagogical programming language code. It can, for example, look at the statistical distribution of any data sets being used; and, in the case of simulators, it can ask the simulator to generate substantial amounts of data so as to determine the statistics of data that will be used during training. These distribution properties can further inform the heuristics used.

The process of picking an appropriate algorithm, etc., can be performed by an AI model that has been trained (and will continue to be trained) by the AI engine, meaning the AI model will get better at building AI models each time a new one is built. A trained AI model, thereby, provides enabling AI for proposing neural networks from assembly code and picking appropriate learning algorithms from a number of machine learning algorithms in one or more databases for training the neural networks. The AI engine can be configured to continuously train the trained AI-engine neural network in providing the enabling AI for proposing the neural networks and picking the appropriate learning algorithms thereby getting better at building AI models.

The architect module 326 can take the codified mental model and pedagogy and then propose a set of candidate low-level learning algorithms, topologies of a complex tasks and concepts, and configurations thereof the architect module 326 believes will best be able to learn the concepts in the model. This is akin to the work that a data scientist does in the toolkit approach, or that the search system automates in the approach with statistical data analysis tools. Here, it is guided by the pedagogical program instead of being a broad search. The architect module 326 can employ a variety of techniques to identify such models. The architect module 326 can generate a topology, such as a directed graph of nodes. The architect module 326 can break down the problem to be solved into smaller tasks/concepts all factoring into the more complex main problem trying to be solved based on the software code and/or data in the defined fields of the user interface supplied from the user/client device. The architect module 326 can instantiate a complex task and layers of concepts feeding into the complex task. The architect module 326 can generate each concept including the concepts with a tap that stores the output action/decision and the reason why that node reached that resultant output (e.g., what parameters dominated the decision and/or other factors that caused the node to reach that resultant output). This stored output of resultant output and the reasons why the node reached that resultant output can be stored in the trained intelligence model. The tap created in each instantiated node provides explainability on how a trained intelligence model produces its resultant output for a set of data input. The architect module 326 can reference a database of algorithms to use as well as a database of network topologies to utilize. The architect module 326 can reference a table or database of best suggested topology arrangements including how many layers of levels in a topology graph for a given problem, if available. The architect module 326 also has logic to reference similar problems solved by comparing signatures. If the signatures are close enough, the architect module 326 can try the topology used to optimally solve a problem stored in an archive database with a similar signature. The architect module 326 can also instantiate multiple topology arrangements all to be tested and simulated in parallel to see which topology comes away with optimal results. The optimal results can be based on factors such as performance time, accuracy, computing resources needed to complete the training simulations, etc.

In an embodiment, for example, the architect module 326 can be configured to propose a number of neural networks, decision trees, or other topologies and heuristically pick an appropriate learning algorithm from a number of machine learning algorithms in one or more databases for each of the number of neural networks. Instances of the learner module 328 and the instructor module 324 can be configured to train the number of neural networks in parallel. The number of neural networks can be trained in one or more training cycles with the training data from one or more training data sources. The AI engine can subsequently instantiate a number of trained AI models based on the concepts learned by the number of neural networks in the one or more training cycles, and then identify a best trained AI model (e.g., by means of optimal results based on factors such as performance time, accuracy, etc.), among the number of trained AI models.

The user can assist in building the topology of the nodes by setting dependencies for particular nodes. The architect module 326 can generate and instantiate neural network topologies for all of the concepts needed to solve the problem in a distinct two-step process. The architect module 326 can generate a description of the network concepts. The architect module 326 can also take the description and instantiate one or more topological shapes, layers, or other graphical arrangements to solve the problem description. The architect module 326 can select topology algorithms to use based on factors such as whether the type of output the current problem has either 1) an estimation output or 2) a discrete output and then factors in other parameters such as performance time to complete the algorithm, accuracy, computing resources needed to complete the training simulations, originality, amount of attributes, etc.

Figure 4B:
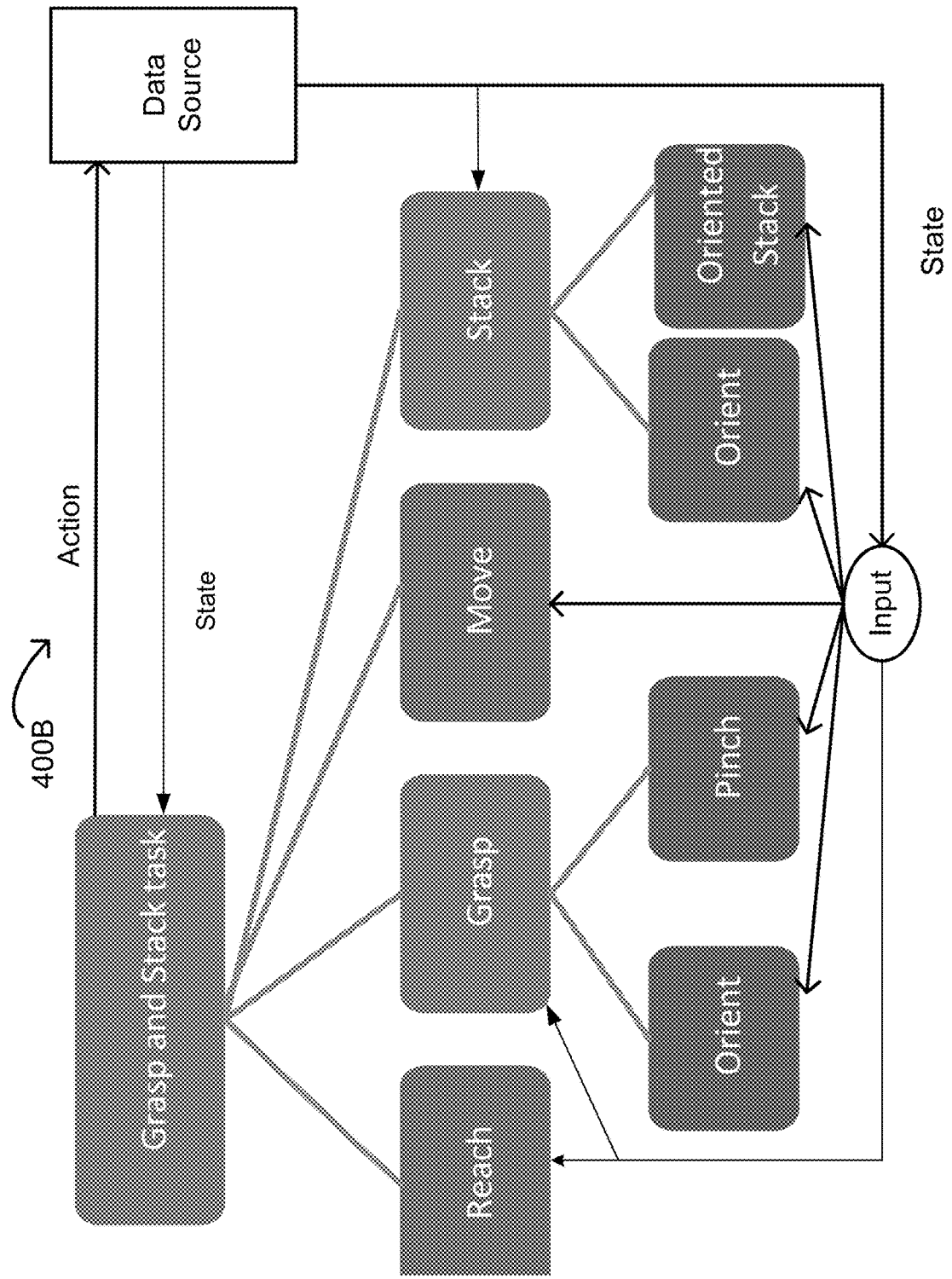
FIG. 4B illustrates a block diagram of an embodiment of a complex task with multiple hierarchical levels of concept nodes.
Figure 4C:
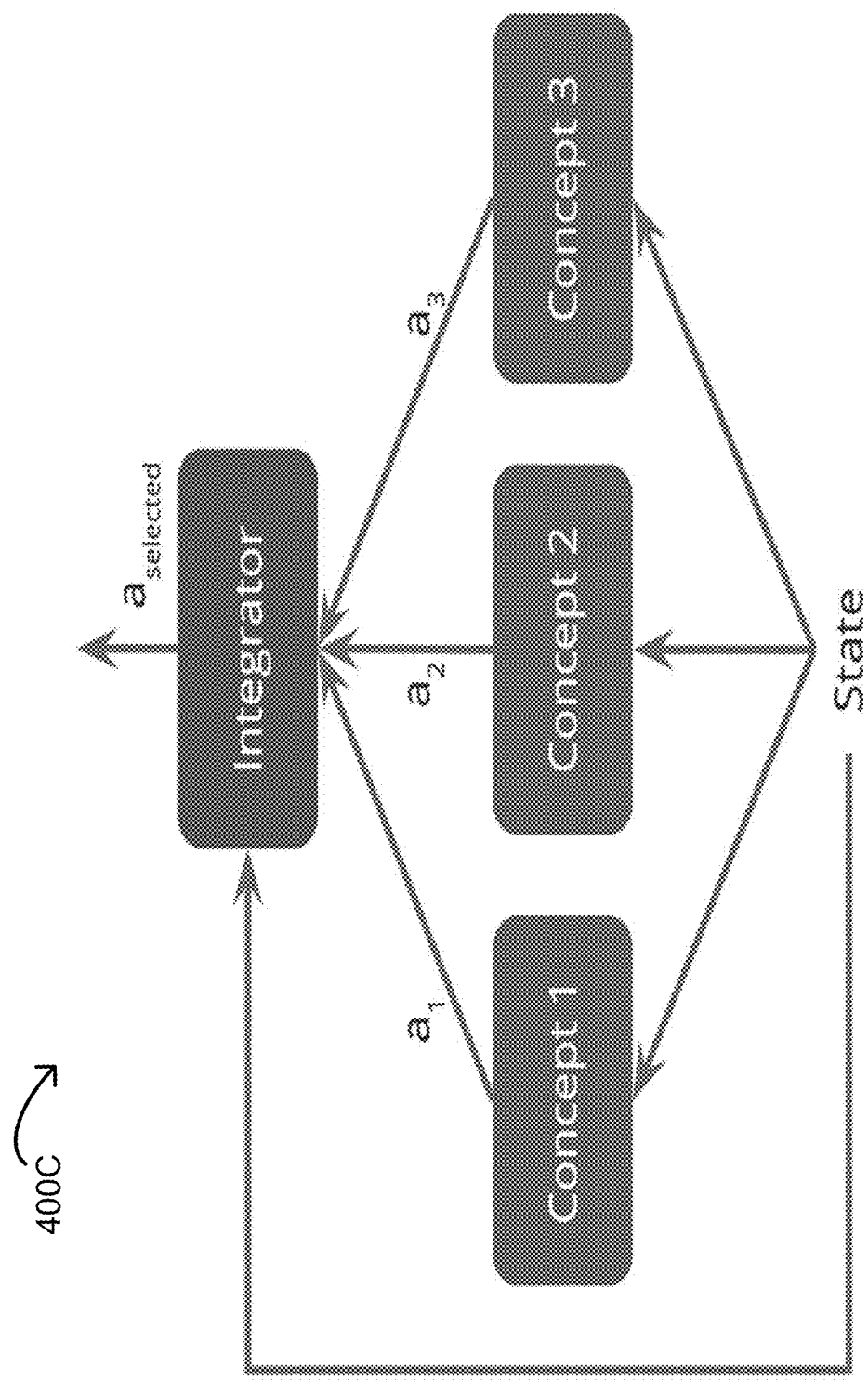
FIG. 4C illustrates a block diagram of an embodiment of a complex main task and its graph of i) a concept node corresponding to an integrator action, and ii) one or more levels of concepts corresponding to the individual actions that hierarchically stem forth from the integrator action in the graph of the AI model.
Figure 4E:
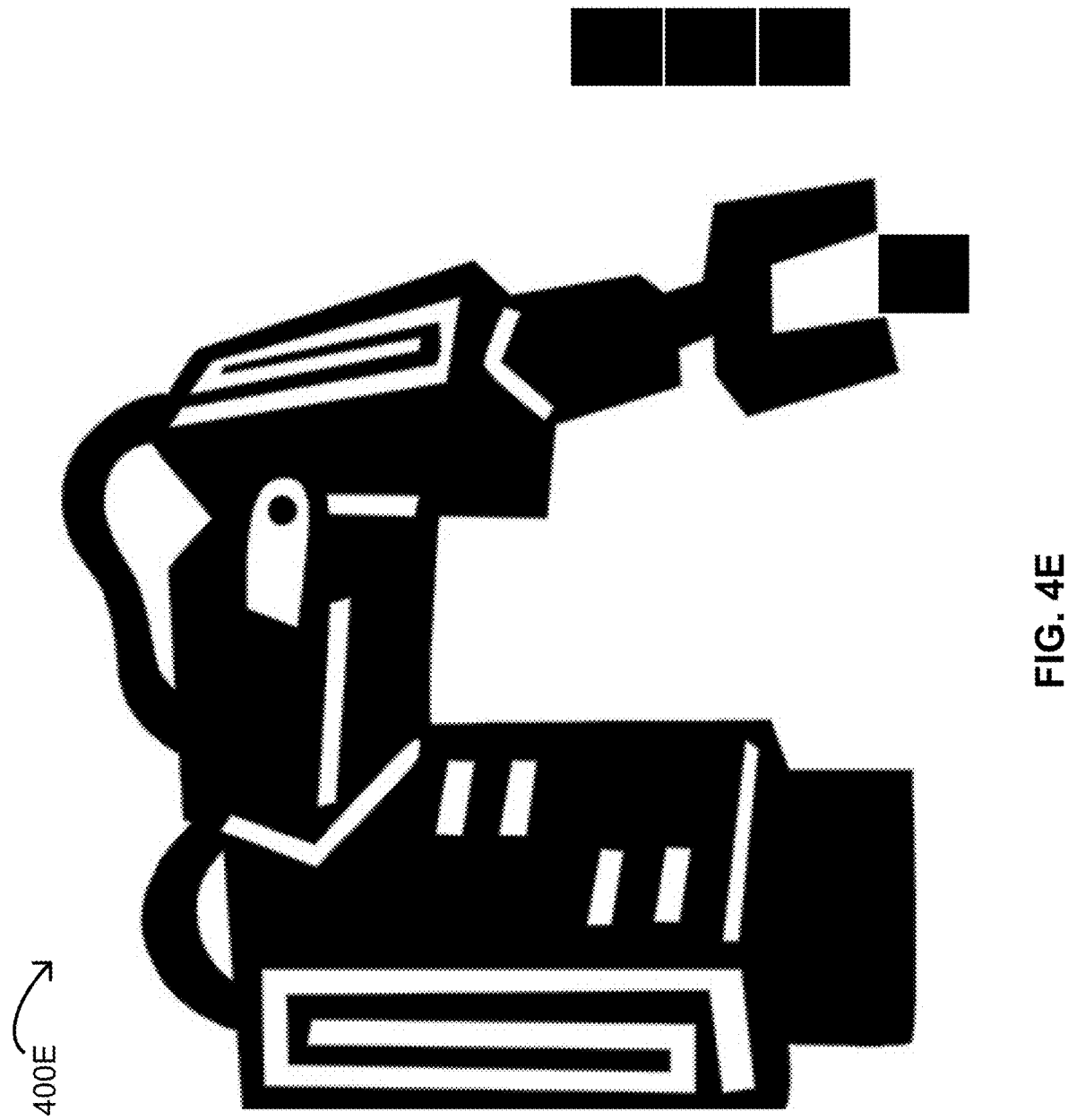
FIG. 4E illustrates a diagram of an embodiment of an example AI model being utilized by a robotic arm to carry out individual actions in the complex task.

FIG. 4E illustrates a diagram of an embodiment of an example AI model being utilized by a robotic arm 400E to carry out individual actions in the complex task. Stages of the complex task may include (a) Moving to the object, (b) Reaching for the object, (c) Grasping the object, and (d) Stacking the object on a stack of objects.

Referring back to FIGS. 4A and 4E, the example challenge is Grasp a block and Stack the block on top of another. (See FIG. 4E.) The AI controlled robot must coordinate finger movement as well as differ its block positions and orientations. Dexterity is hard and flexibility to Grasp and Stack in different positions and orientations is a must. The solution is decomposition of the overall task into individual actions. (See two different example decompositions in FIGS. 4A and 4B.) The AI engine first trained the AI model to learn the concepts of Grasp and Stack using reinforcement learning. These trainings of the different AI objects corresponding to their concepts can be done independently of each other. In addition, multiple simulations may be occurring at the same time for each concept in order to speed up the training on that specific concept. Once the Grasp and Stack concepts are trained, then all four AI concepts are then trained to learned to work with each other. A meta-controller—(e.g., integrator/selector concept)—then learns to combine the newly trained concepts with an existing Move classical controller and a Reach function into a complete Grasp-n-Stack complex task. The integrator quickly learns to select the correct AI concept for that task. The integrator can also very quickly learn, if need be, to slightly adjust the training of each AI concept to have them work together to achieve the main task. The AI engine's method of assembling the concepts successfully solves the entire complex task, and is, for example, multiple times faster than prior techniques in a similar setting.

In parallel to the training of the Stack concept, the instructor module and learner module may cooperate to train the AI object corresponding to the Grasp concept. The instructor module and learner module may cooperate to put in the algorithms and curriculum for the Grasp training. Initially, the AI controlled robot is expected to flail and fail. However, over time, the AI controlled robot learns what to do based on the reward the AI engine gives the AI controlled robot (for success).

In parallel to the training of the Grasp concept, the instructor module and learner module may cooperate to train the AI object corresponding to the Stack concept. The instructor module and learner module may cooperate to put in the algorithms and curriculum for the Stack AI concept to train on.

Note, for designing reward functions within the Grasp and Stack concepts, a concept of orienting the hand for Grasping and/or Stacking the object can be learned. (See difference between FIGS. 4B and 4A.) Thus, referring to FIG. 4B, to further simplify the learning problem, the modules further break the top level concept of Grasp into a lower level of two concepts of: Orienting the hand around object in preparation for Grasping, and Pinching the object. Likewise, the modules further break the top level concept of Stacking into a lower level of two concepts: Orienting the hand around object in preparation for stacking, and Orienting the stack, for a total of eight actor concepts in the concept network.

Using hierarchical decomposition with deep reinforcement learning, the AI engine platform achieves for example, a robotics control benchmark, with an order of magnitude fewer training cycles. Thus, an enterprise could use hierarchical decomposition process of breaking down the overall task into multiple smaller tasks being trained in parallel rather than using a single end-to-end algorithm. Once each AI object corresponding to a given concept is trained on its corresponding individual task, then all of the trained AI objects can be trained to work with each other to achieve the overall task. This process trains multiple AI concepts in parallel and then combines the trained versions of the concepts to achieve a similar desired result to the one end-to-end algorithm but in a faster amount of time and possibly with better accuracy. For example, a simulated robot or CNC machine may successfully train upon the individual actions of i) Grasping a block and ii) Stacking the block on top of one another, in parallel to each other and apply deep reinforcement learning algorithms to learn these concepts. Training a system using multiple concepts, for example, the concepts of Reach, Grasp, and Stack, can be trained on individually and in parallel to each other, which requires far less training time and computing cycles. Next, those trained concepts can be trained to work with each other to accomplish the end result of what the single end-to-end algorithm would typically accomplish.

In addition, differently trained AI objects can be assembled into the AI model in order to decrease an overall training time. Thus, AI objects of the AI model may include a blend of at least a first set and second set of AI objects being trained by the instructor module via reinforcement learning, such as the Grasp, the Stack, and the Orient concepts, and a third set of AI objects that use classical control, such as the Move concept, which are merely integrated in by the integrator. This all may occur while a conductor service manages multiple simulations from the data sources in parallel at the same time to train the first and second sets of AI objects with the deep reinforcement learning.

Hierarchical Deep Reinforcement Learning for Robotics

In an example use case, the system may use hierarchical decomposition, deep reinforcement learning for flexible dexterous manipulation by a robot (see FIG. 4E). The AI engine machine teaching platform enables subject matter experts to teach an AI concept how to solve complex problems. A key feature of the platform is the ability to decompose complex tasks using concept networks—distinct aspects of the main task that can be trained separately and then combined using an integrator component. This approach may be used to solve a complex robotics task requiring dexterous manipulation, for example, using a simulated robot arm to pick up an object and Stack it on another one. The AI engine applied this decompositional approach, improving training efficiency and flexibility.

Learning is also greatly enhanced from interacting a simulation with feedback from a real world environment. As a result, it is important to understand whether or not a system's operations and interactions with its environment can be simulated, or modeled. A deep reinforcement learning iterative learning process with the AI software can be very effective. Overall, the AI objects corresponding to concepts can learn individual tasks in a simulation/modelling world. Next, the trained AI objects will apply the trained concept in a real world situation. Next, the trained AI objects incorporate learned feedback about working in the real world back into a simulation environment to refine/tune the training of the concept(s). Lastly, the trained AI objects then apply the refined trained concepts in the real world again.

For example, in each iteration, the machine learning software makes a decision about the next set of parameters for friction compensation and the next set of parameters for motion. These decisions are made by the modules of the AI engine. It is anticipated that the many iterations involved will require that the optimization process be capable of running autonomously. To achieve this, a software layer is utilized to enable the AI engine software to configure the control with the next iteration's parameterization for friction compensation and its parameterization of the axis motion. The goal for deep reinforcement learning in this example user's case is to explore the potential of the AI engine to improve upon manual or current automatic calibration. Specifically, to eliminate the human expert and make the AI the expert in selecting parameter values, equal or improve upon the degree of precision, reduce the number of iterations of tests needed, and hence the overall time needed to complete the circularity test. The AI engine is coded to understand machine dynamics and develop initial model of machine's dynamics. Development of a simulation model is included based on initial measurements. The AI engine's ability to set friction and backlash compensation parameters occurs within the simulation model. After the initial model training occurs, then the training of the simulation model of friction and backlash compensation is extended with the advice from any experts in that field. The training of the simulation model moves from the simulation model world, after the deep reinforcement learning is complete, to a real world environment. The training of the concept takes the learning from the real machine and uses it to improve and tune the simulation model.

FIG. 4B illustrates a block diagram of an embodiment of an AI model 400B learning a complex task with multiple hierarchical levels of concept nodes.

As previously discussed, the complex task is composed of several concepts horizontally across its graph, such as Reaching, Moving, Grasping, and Stacking, that are independent of one another. The top level Grasp-n-Stack concept incorporates an integrator concept. The next level down concepts of the Grasping concept and the Stacking concept each incorporate an integrator concept. The graph vertically has levels. For example, the Grasp concept is made up of the concepts of Orient and Pinch. Likewise, the Stack concept is made up of the concepts of Orient the block and the Stack of blocks orientation.

For FIG. 4B, each learned actor concept has its own reward function, independent of the overall problem. Again FIG. 4B shows three integrator nodes, three control concepts, and three classical controllers. The Grasp-n-Stack AI object, the Grasp AI object, and the Stack AI object, each incorporates an integrator node. Both Orient the hand concepts are learned concepts as well as the Orient the stack of blocks concept. The Reach, Move and Pinch concepts may be implemented as classical controllers. Each node also implicitly takes the state as input, and can be paired with input and output transformations.

FIG. 4C illustrates a block diagram of an embodiment of a complex main task and its graph 400C of i) a concept node corresponding to an integrator action, and ii) one or more levels of concepts corresponding to the individual actions that hierarchically stem forth from the integrator action in the graph of the AI model.

The concept node of the integrator action can be trained via reinforcement learning to learn to choose an action recommended from the two or more AI objects in the levels stemming from the integrator node in the graph by choosing a particular action that is considered most applicable based on a current state data. This is a discrete reinforcement learning problem, that the AI engine solves with an example learning algorithm, such as the DQN algorithm, using overall task success as the reward. (Note, any discrete reinforcement learning algorithm could be used.) To make this effective, the AI engine may not choose a new concept at each time step but rather train a specific concept until it reaches a termination condition. The integrator may use concepts with a long-running termination condition: each concept can have pre-conditions for when it can be selected, and a run-until condition to meet before switching to another individual action. This gives the designer an easy way to specify constraints like "don't try to Grasp until you're close to the object", and "once you start to move, continue that for at least 100 time steps".

FIG. 4D illustrates a block diagram of an embodiment of a graph 400D of the training of two or more different sub concepts corresponding to the individual actions in the complex task, in parallel, which the parallel training and simpler reward functions speed up an overall training duration for the complex task on the one or more computing platforms.

The AI engine using machine teaching provides the abstraction and tooling for developers, data scientists, and subject matter experts to teach domain specific intelligence to a system. Developers codify the specific concepts they want a system to learn, how to teach them, and the training sources required (e.g., simulations, data), using a pedagogical software programming language, such as Inkling™. The system then teaches each individual AI object on learning its particular skill, on its own, which will go faster than trying to train on that skill while additional variables are being thrown into that training curriculum from other concepts.

Concepts can be broken down into smaller individual actions and then training occurs specifically for a concept starting at its lowest level of decomposition (i.e., the leaf in a tree structure). For example, looking at the graph 4D and FIG. 4A, the "Grasp the object" concept and the "Stack the object" concept actions are simple tasks for which the AI system uses deep reinforcement learning. The AI engine trains the Grasp concept and Stack concept with reinforcement learning, using, for example, a TRPO algorithm.

Training the Stack concept, for example, took <14 million simulator training cycles>, which is equivalent to <139 hours> of simulated robot time. The Grasp concept was, for example, slightly <faster>, taking <125 hours> of simulated robot time.

Each concept can have different state+action spaces. Typically, these state+action spaces can be smaller than a globally-applicable state/action space, which makes the problem easier and learning faster. Since the concepts are much simpler, their goals can be defined on subsets of state space, significantly constraining the necessary exploration and leading to data-efficient learning even in complex environments. The AI engine can mix neural and classical controllers in the same task. The AI engine can enable hierarchical decomposition—a single concept can itself be an integrator choosing among subcomponents. The AI engine can use this to split Grasp-n-Stack concept into four sub concepts of i) Grasp, ii) Stack, iii) Reach, and iv) Move. Each of these concepts, such as the Grasp and Stack concepts, can be trained in parallel.

Multiple Managed Simulations Occurring at the Same Time to Decrease an Overall Training Time Multiple managed simulations occurring at the same time to train multiple AI concepts improves the system's capability to extract and optimize knowledge faster from large and complex simulations and data, makes users using the system more productive, and decreases the duration of training to accomplish a complex task. Each concept, such as Grasp, may be trained in a parallel with another concept. In addition, already trained concepts, such as Reach, may be incorporated into the AI model. In addition, multiple versions of a particular concept may be trained in parallel with each other.

The goals of multiple managed simulations with the same AI engine may be to:
 i. Enable multiple managed simulations running in one instance in the cloud (public cloud, virtual private cloud, private cloud (including an on-premises installation of the AI engine)) to train that concept.
 ii. Enable multiple simulations running on one computer (offline) to train that concept.
 iii. Scale the training performance linearly (or nearly linear) with the number of simulators.
 iv. Alternatively, enable multiple managed simulations running in multiple instances in the cloud (public cloud, virtual private cloud, private cloud) or on premises to train that concept.
 v. Enable multiple simulations running on multiple instances in the cloud (public, VPC, private cloud) to train multiple concepts.

$$\text{Performance} = \frac{\text{Time to train concept with 1 } sim}{\text{Time to train concept with } N \text{ amount } sims \text{ in parallel}}$$

Figure 5:
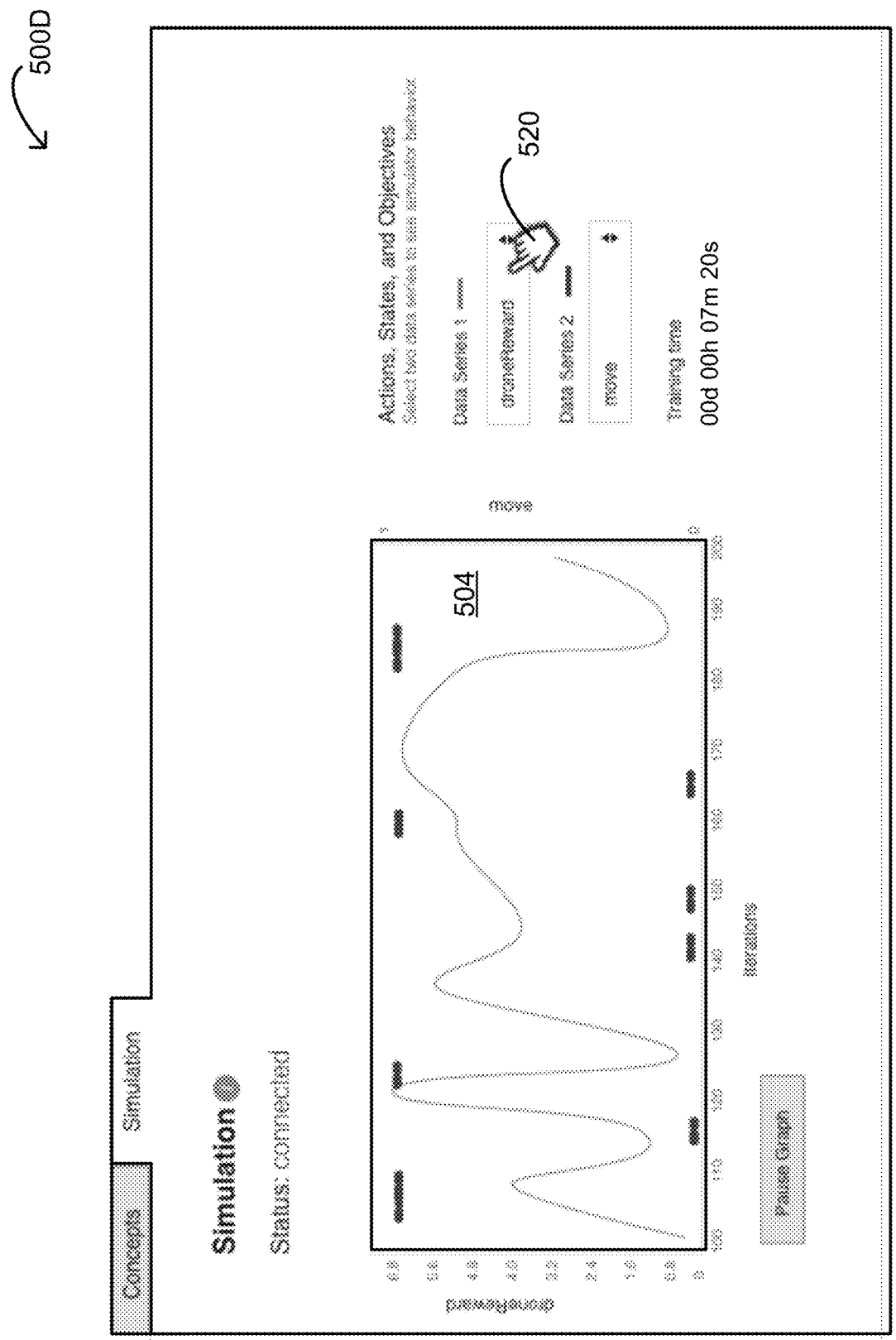
FIG. 5 illustrates a block diagram of an embodiment of a user interface for a simulator training one or more concept nodes using reinforcement learning to learn to choose an action recommended from the two or more AI object in the levels stemming from the integrator.

FIG. 5 illustrates a block diagram of an embodiment of a user interface 520 for a simulator training one or more concept nodes using reinforcement learning to learn to choose an action recommended from the two or more AI object in the levels stemming from the integrator. The system may implement a form of deep reinforcement learning in contrast to a standard notion of running a single end-to-end algorithm training. In the deep learning, the concept nodes of the AI model being trained interact with an environment over time. In an embodiment, at each time step, the concept node receives a state in a state space, and selects an action from an action space, and follows a policy, which controls the concept node's behavior, i.e., a mapping from a state to actions, then receives a scalar reward, and transitions to the next state, according to the environment dynamics, or model, for the reward function. The concept node also receives feedback from its selected actions and performance and then evaluates the feedback to alter its training.

Figure 6:
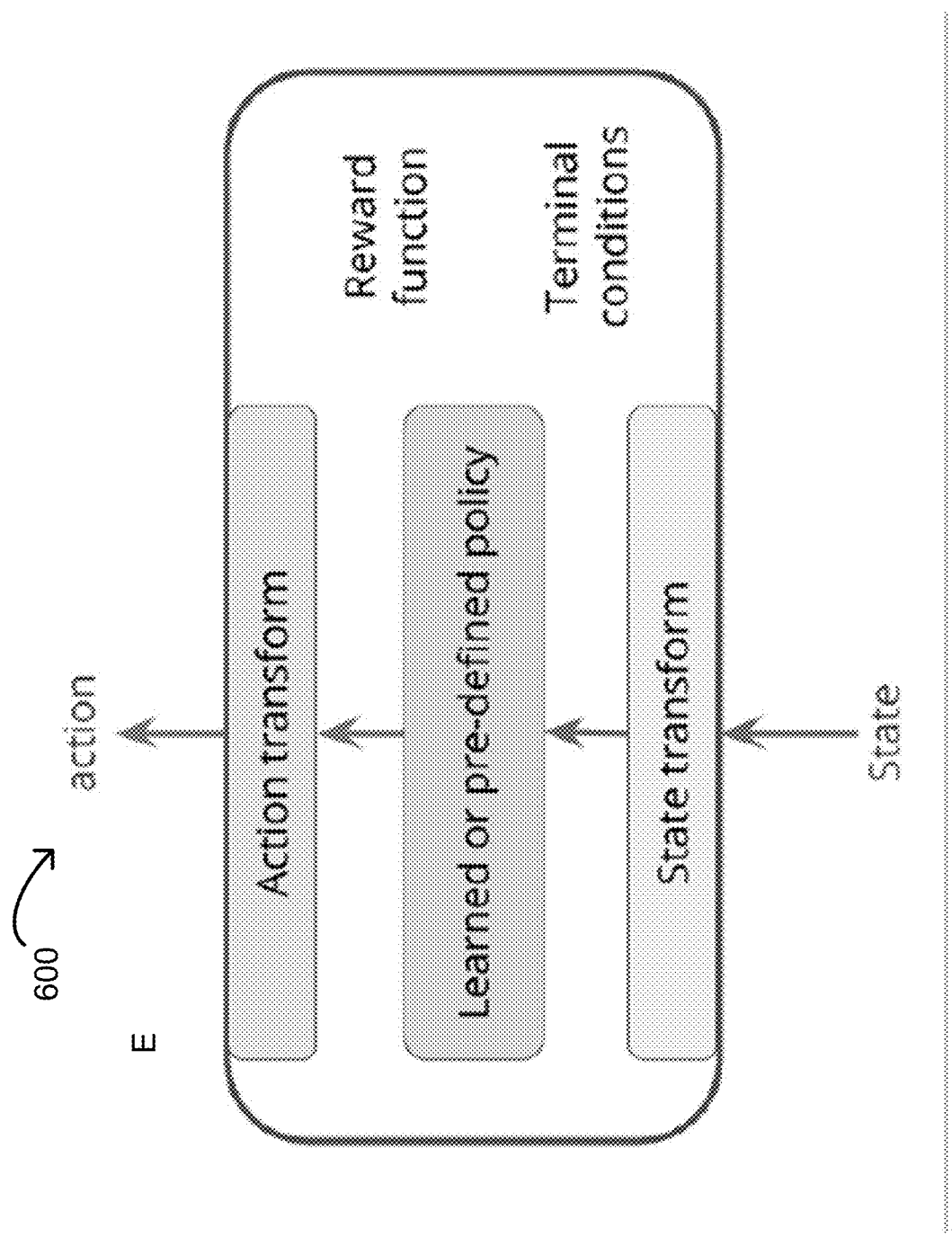
FIG. 6 illustrates a block diagram of an embodiment of the AI engine using simpler reward functions focused for solving each individual action.

FIG. 6 illustrates a block diagram of an embodiment of an AI engine 600 using simpler reward functions focused for solving each individual action.

A concept interacts with reinforcement learning with an environment 'E' in discrete time steps. At each time step in the training, the concept observes a state, performs an action, transitions to a new state, and receives feedback reward from environment 'E', such a robotic arm successfully stacking a prism on a stack.

An example reinforcement learning problem is where a concept 1 interacts with the environment 'E' in discrete time steps. At each time step 't', the agent observes a state 'st 2 Rn', performs an action at '2 Rn', transitions to a new state 'st+1 2 Rn', and receives feedback reward 'rt 2 R' from environment 'E.' The goal of reinforcement learning is to optimize the agent's action-selecting policy such that it achieves maximum expected return of the feedback reward 'rt 2 R' potentially averaged over moving window of 'X' amount of time steps/training cycles.

The AI engine solves complex tasks using reinforcement learning to facilitate problem decomposition, simplify reward function design, train quickly and robustly, and produce a policy that can be executed safely and reliably when the resulting trained AI concept is deployed. The state vector provided to the AI concept can vary from AI concept to AI concept, as may the action space.

In an embodiment, a learned actor concept's reward function could be defined in terms of the concept's transformed state, and may not be not visible to the rest of the concept network. An AI concept can include both state and action transformations. The reward function and terminal conditions for a state can be written in terms of the concept's transformed state, and are independent of the rest of the concept network.

Figure 4F:
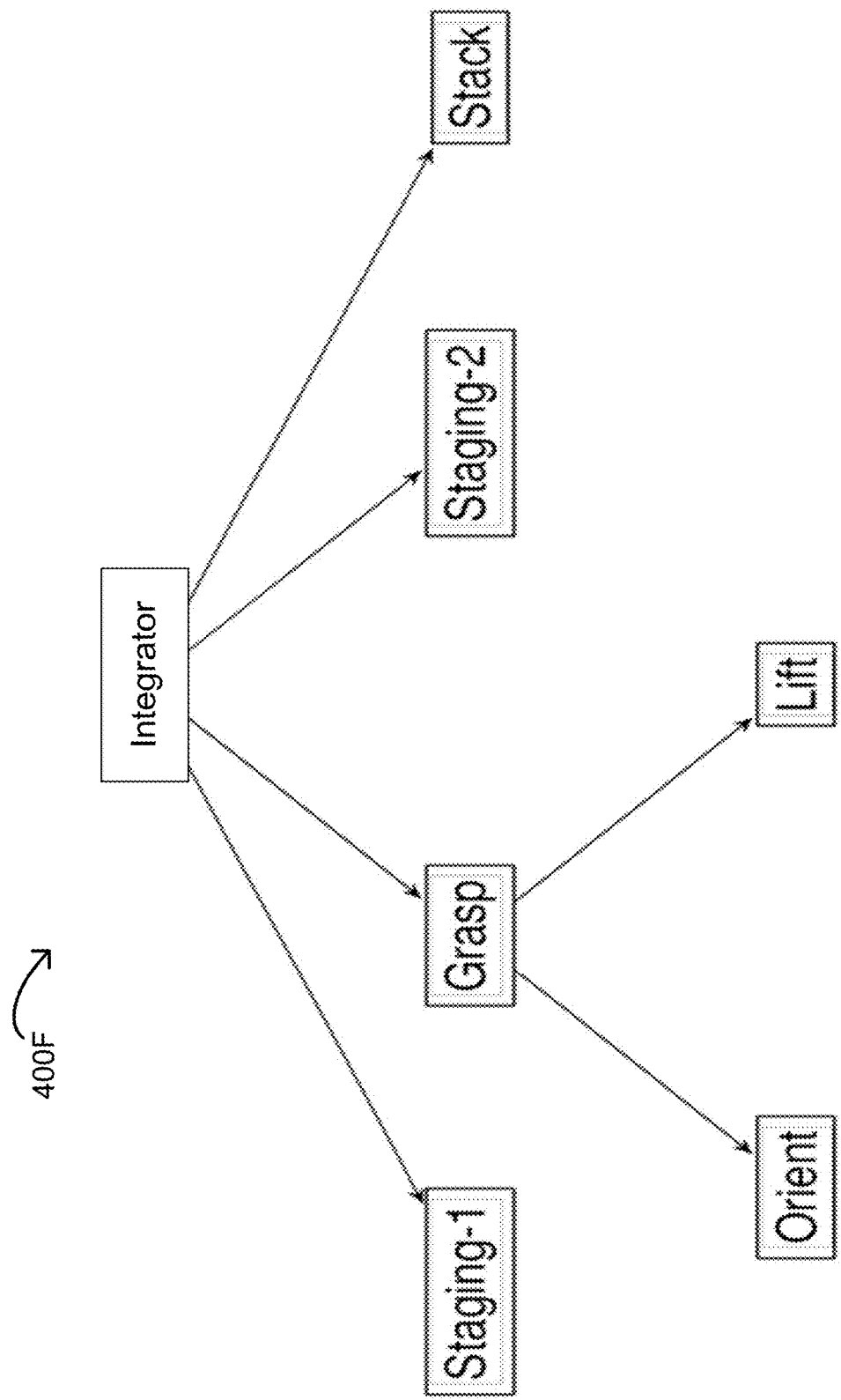
FIG. 4F illustrates a block diagram of an embodiment of the AI engine that solves the example "Grasp and Stack" complex task with concept network reinforcement learning.

FIG. 4F illustrates a block diagram of an embodiment of the AI engine that solves the example "Grasp and Stack" complex task 400F with concept network reinforcement learning. In this example, the AI engine solves the example complex task of Grasping a rectangular prism and precisely Stacking it on top of a cube. The AI engine initially broke the overall task down into four concepts: 1) Reaching the working area (staging 1), 2) Grasping the prism, 3) Moving to the second working area (staging 2), and 4) Stacking the prism on top of the cube. The Grasp concept can further be decomposed into an Orient the hand concept and Lift concept. Thus, to simplify the learning problem by using a single policy for each individual action the concept of Grasp, the AI engine broke the Grasping concept into two more concepts: Orienting the hand around the prism in preparation for grasping, as well as clasping the prism to Lift the prism, for a total of five actor concepts in the concept network. Three of these concepts—Orienting, Lifting, and Stacking used the TRPO algorithm to train, while the Reach concept (Staging-1) and the Moving concept to the working area (Staging-2) were handled with inverse kinematics.

Again, the state vector provided to the AI concept can vary from AI concept to AI concept, as may the action space. In this example complex task, all actions correspond to target velocities for one of nine associated joints.

The integrator chooses between two classical controllers to move to the staging area for grasp or stack, a stack concept, or a grasp concept. The grasp concept in turn chooses between an orient concept and a move concept. Stack, Orient, and Move are actor concepts trained using TRPO, while the full concept selector and the Grasp selector were trained using DQN. Each node was trained after all of its concepts had finished training and their weights were frozen. The TRPO concepts may be trained in parallel using 16 parallel workers. Default hyper parameters were used, including a batch size of 1024, a maximum KL divergence of 0.01, a gamma of 0.99, and a step size of 1e-3. We made no modifications to the underlying algorithm to facilitate replication and comparison. The DQN concepts may be trained using only a single worker. DQN may train with a batch size of 64, learner memory capacity of 50000 samples, a minimum learner memory threshold of 1000 samples, an exploration probability that decayed from 1 to 0.02 over 10000 steps, a gamma of 0.98, and a learning rate of 5e-4.

Figure 7:
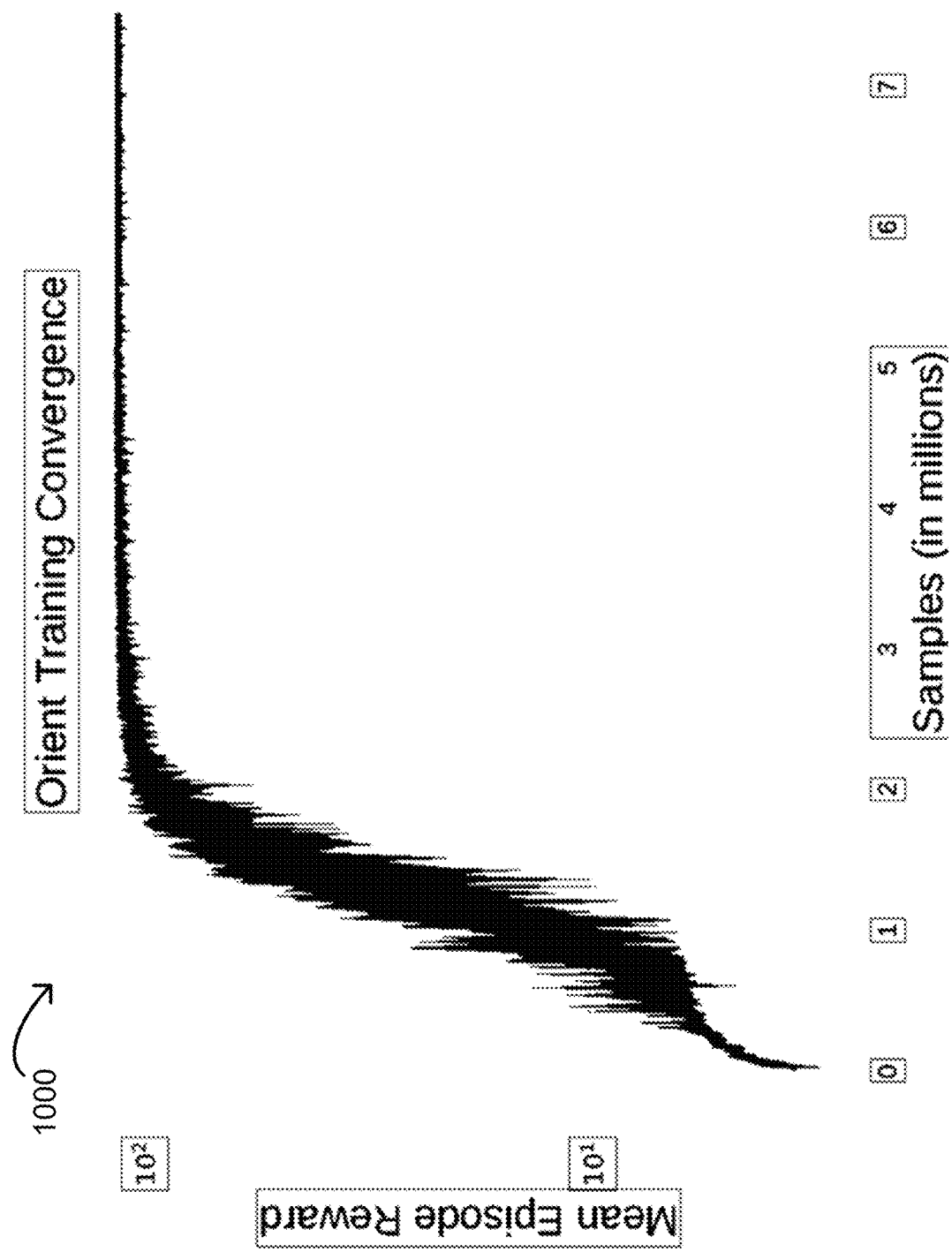
FIG. 7 illustrates a graph of an embodiment of the training of the individual action of the Orient from FIG. 4F and its reward function focused for that action.
Figure 8:
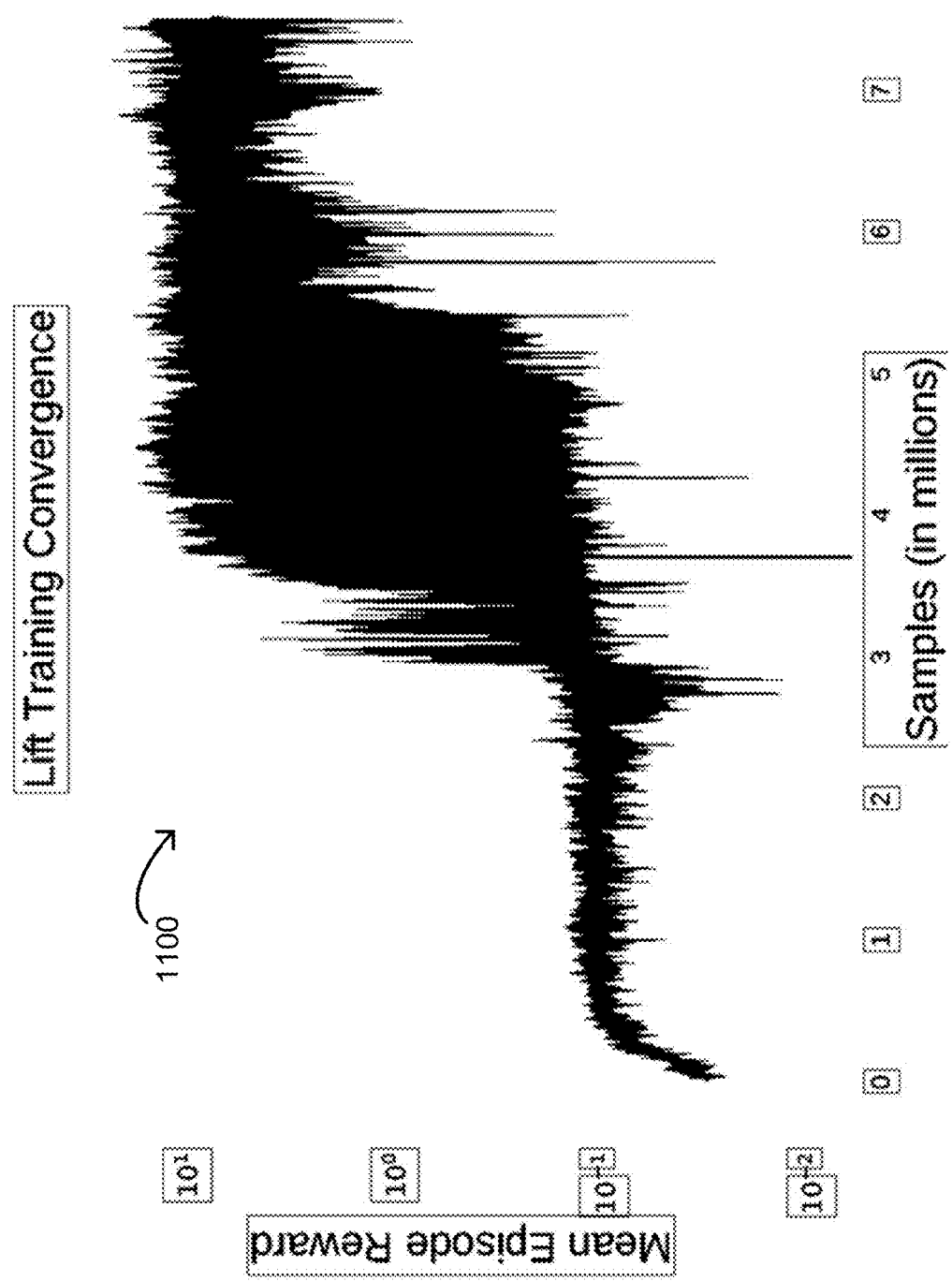
FIG. 8 illustrates a graph of an embodiment of the training of the individual action of Lift from FIG. 4F and its reward function focused for that action.

FIG. 7 illustrates a graph 1000 of an embodiment of the training of the individual action of Orient from FIG. 4F and its reward function focused for that action. FIG. 8 illustrates a graph 1100 of an embodiment of the training of the individual action of Lift from FIG. 4F and its reward function focused for that action.

The graphs show the concept's training convergence, either the Orient concept or the Lift concept, with a mean episode reward plotted against training samples in the millions. The shaded area represents the min to max. The shaded area is a 95% confidence interval for the mean. For the Lift concept, tight terminal conditions are set to encourage precise vertical lift, which makes finding an effective policy more challenging. The Orient and Stack concepts trained in approximately 2-3 million samples using shaping rewards and guiding terminals, without the need for hyper parameter tuning. The training graphs using reinforcement learning with the TRPO concepts are presented in FIGS. 7-9. Note, a very tight terminal constraint on the distance the prism can move from its starting XY coordinates, is designed to encourage a straight vertical lift, and also increased the number of samples required to find a good policy through exploration. Better designed terminal conditions and rewards might speed up training on the concepts.

Figure 9:
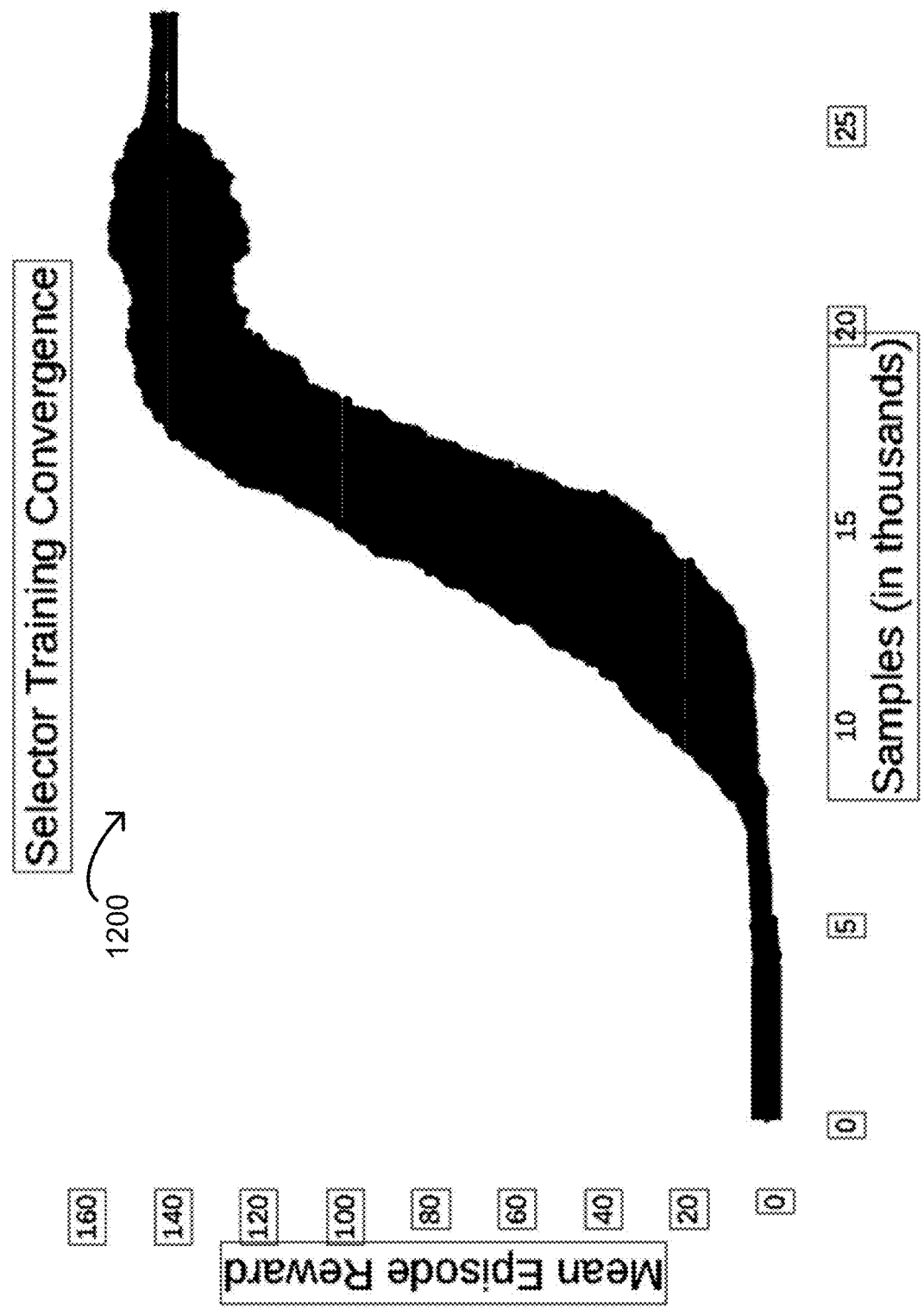
FIG. 9 illustrates a graph of an embodiment of the training of the interactions of the individual actions to achieve the complex task of Grasp-n-Stack and its reward function focused for that action.

FIG. 9 illustrates a graph 1200 of an embodiment of the training of the interactions of the individual actions to achieve the complex task of Grasp-n-Stack and its reward function focused for that action.

In an example, the full concept integrator trained in 22,000 samples (FIG. 9), though the integrator itself only saw 6,000 samples as it does not receive state transitions during long running execution of children. When concepts are compatible—i.e., a concept ends within the operating constraints of another—and there exists some chain of compatible concepts that will achieve a goal, the integrator can learn to order these concepts very quickly, without the need to train a monolithic network to subsume the components. Models converged on good solutions between 16000 and 25000 samples. The task of ordering the concepts can be learned nearly two orders of magnitude faster than the individual concepts, or 45× faster than the single policy trained by Popov et al. [2017] using one million samples and previously trained concepts.

Note, training performance for DQN was evaluated with ten testing episodes for every 50 training episodes, with mean performance in each testing pass plotted in the integrator performance graphs shown in FIGS. 7-9. Training performance for TRPO uses the raw training episode returns, which are less representative of true policy performance but served well enough to show when the policy had converged. In plots showing the performance of DQN, the X axis represents transitions sampled so far, and the Y axis represents mean episode reward. Final evaluation of robustness for both DQN and TRPO was done without exploration.

In an embodiment, in 500 episodes we observed no task failures during execution, both with the concepts executed individually in their own environments and the tree with integrators solving the full task. The concept network is able to very reliably Grasp an object and precisely Stack it on another, both with varying position and orientation.

More Architecture Details

Referring back to FIGS. 2A and 2B, the system may further include as follows.

Instructor Module

The instructor module 324 is a component of the system responsible for carrying out a training plan codified in the pedagogical programming language. Training can include teaching a network of intelligent processing nodes to get one or more outcomes, for example, on a simulator. To do so, the instructor module 324 can form internal representations about the system's mastery level of each concept, and adapt the execution plan based on actual performance during training. A directed graph of lessons can be utilized by the instructor module 324 to determine an execution plan for training (e.g., which lessons should be taught in which order). The training can involve using a specific set of concepts, a curriculum, and lessons, which can be described in the pedagogical programming language file.

The instructor module 324 can train easier-to-understand tasks earlier than tasks that are more complex. Thus, the instructor module 324 can train concept AI objects and then higher-level AI objects. The instructor module 324 can train concept AI objects that are dependent on other nodes after those other AI objects are trained. However, multiple nodes in a graph may be trained in parallel. The instructor module 324 can run simulations on the AI objects with input data including statistics and feedback on results from the AI object being trained from the learner module 328. The learner module 328 and instructor module 324 can work with a simulator or other data source to iteratively train an AI object with different data inputs. The instructor module 324 can reference a knowledge base of how to train an AI object efficiently by different ways of flowing data to one or more AI objects in the topology graph in parallel, or, if dependencies exist, the instructor module 324 can train serially with some portions of lessons taking place only after earlier dependencies have been satisfied. The instructor module 324 can reference the dependencies in the topology graph, which the dependencies can come from a user specifying the dependencies and/or how the arrangement of AI objects in the topology was instantiated. The instructor module 324 can supply data flows from the data source such as a simulator in parallel to multiple AI objects at the same time where computing resources and a dependency check allows the parallel training.

The instructor module 324 may flow data to train AI objects from many data sources including, but not limited to a simulator, a batch data source, a random-data generator, and historical/guided performance form from past performance. A simulator can give data and get feedback from the instructor module 324 during the simulation that can create an iterative reactive loop from data inputs and data outputs from the AI objects. A batch data source can supply batched data from a database in at least one example. A random-data generator can generate random data based on user-input parameters.

Learner Module

The learner module 328 is a component of the system configured to carry out the actual execution of the low-level, underlying AI algorithms. In training mode, the learner module 328 can instantiate a system conforming to what was proposed by the architect module 326, interface with the instructor module 324 to carry out the computation and assess performance, and then execute the learning algorithm itself. The learner module 328 can instantiate and execute an instance of the already trained system. Eventually, the learner module 328 writes out network states for each trained sub-AI object and then a combination of the topological graph of the main node with all of the sub-nodes into a trained AI model. The learner module 328 can also write the stored output of each node and why that node arrived at that output into the trained AI model, which gives explainability as to how and why the AI proposes a solution or arrives at an outcome.

Hyperlearner Module

The hyperlearner module 325 can perform a comparison of a current problem to a previous problem in one or more databases. The hyperlearner module 325 can reference archived, previously built and trained intelligence models to help guide the instructor module 324 to train the current model of nodes. The hyperlearner module 325 can parse an archive database of trained intelligence models, known past similar problems and proposed solutions, and other sources. The hyperlearner module 325 can compare previous solutions similar to the solutions needed in a current problem as well as compare previous problems similar to the current problem to suggest potential optimal neural network topologies and training lessons and training methodologies.

Simulator

When, the curriculum trains using a simulation or procedural generation, then the data for a lesson is not data to be passed to the learning system, but the data is to be passed to the simulator. The simulator can use this data to configure itself, and the simulator can subsequently produce a piece of data for the learning system to use for training. This separation permits a proper separation of concerns. The simulator is the method of instruction, and the lesson provides a way to tune that method of instruction, which makes it more or less difficult depending on the current level of mastery exhibited by the learning system. A simulation can run on a client machine and stream data to the AI engine for training. In such an embodiment, the client machine needs to remain connected to the AI engine while the AI model is training. However, if the client machine is disconnected from the server of the AI engine, it can automatically pick up where it left off when it is reconnected. Note, if the system trains using data, then the data is optionally filtered/augmented in the lessons before being passed to the learning system.

Note, 1) simulations and procedural generation are a good choice versus data in a variety of circumstances; and 2) concepts are a good choice versus streams when you can more easily teach versus calculate.

Training Mode

A machine learning algorithm may have of a target/outcome variable (or dependent variable) which is to be predicted from a given set of predictors (independent variables). Using this set of variables, the AI engine generates a function that maps inputs to desired outputs. The coefficients and weights plugged into the equations in the various learning algorithms are then updated after each epoch/pass of training session until a best set of coefficients and weights are determined for this particular concept. The training process continues until the model achieves a desired level of accuracy on the training data.

When in training mode the architect module 326 of the AI engine is configured to i) instantiate the network of processing nodes in any layers of hierarchy conforming to concepts of the problem being solved proposed by the user and ii) then the learner module 328 and instructor module 324 train the network of processing nodes in that AI model. To effect the foregoing, the AI engine can take compiled pedagogical programming language code and generate an AI-model learning topology, and proceed to follow the curricula to teach the concepts as specified. Depending on the model, training can potentially take substantial amounts of time. Consequently, the AI engine can provide interactive context on the status of training including, for example, showing which nodes are actively being trained, the current belief about each node's mastery of its associated concept, overall and fine-grained accuracy and performance, the current training execution plan, and/or an estimate of completion time. As such, in an embodiment, the AI engine can be configured to provide one or more training status updates on training a neural network selected from i) an estimation of a proportion of a training plan completed for the neural network, ii) an estimation of a completion time for completing the training plan, iii) the one or more concepts upon which the neural network is actively training, iv) mastery of the neural network on learning the one or more concepts, v) fine-grained accuracy and performance of the neural network on learning the one or more concepts, and vi) overall accuracy and performance of the neural network on learning one or more mental models.

Because the process of building pedagogical programs is iterative, the AI engine in training mode can also provide incremental training. That is to say, if the pedagogical programming language code is altered with respect to a concept that comes after other concepts that have already been trained, those antecedent concepts do not need to be retrained.

Additionally, in training mode, the user is able to specify what constitutes satisfactory training should the program itself permit indefinite training.

Meta-Learning

Meta-learning is an advanced technique used by the architect module 326. It is, as the name implies, learning about learning. What this means is that as the architect module 326 can generate candidate algorithm choices and topologies for training, it can record this data along with the signature for the model and the resultant system performance. This data set can then be used in its own learning system. Thus, the architect module 326, by virtue of proposing, exploring, and optimizing learning models, can observe what works and what does not, and use that to learn what models it should try in the future when it sees similar signatures.

To effect meta-learning, the AI engine can include a meta-learning module configured to keep a record such as a meta-learning record in one or more databases. The record can include i) the source code processed by the AI engine, ii) mental models of the source code and/or signatures thereof, iii) the training data used for training the neural networks, iv) the trained AI models, v) how quickly the trained AI models were trained to a sufficient level of accuracy, and vi) how accurate the trained AI models became in making predictions on the training data.

For advanced users, low-level details of a learning topology can be explicitly specified completely or in part. The architect module 326 can treat any such pinning of parameters as an override on its default behavior. In this way, specific algorithms can be provided, or a generated model can be pinned for manual refinement.

Guiding Training

The first step the AI engine will take is to pick an appropriate learning algorithm to train the Mental Model. This is a critical step in training AI. The AI engine has knowledge of many of the available learning algorithms and has a set of heuristics for picking an appropriate algorithm as well as an initial configuration to train from.

Once an algorithm is chosen, the AI engine will proceed with training the AI model's Mental Model via the Curricula. The AI engine manages all of the data streaming, data storage, efficient allocation of hardware resources, choosing when to train each concept, how much (or little) to train a concept given its relevance within the Mental Model (i.e., dealing with the common problems of overfitting and underfitting), and generally is responsible for producing a trained AI model based on the given Mental Model and Curricula.

As is the case with picking an appropriate learning algorithm, guiding training-notably avoiding overfitting and underfitting-to produce an accurate AI solution is a task that requires knowledge and experience in training AIs. The AI engine has an encoded set of heuristics manage this without user involvement. Similarly, the process of guiding training is also a trained AI model that will only get smarter with each trained AI model it trains. The AI engine is thus configured to make determinations regarding i) when to train the AI model on each of the one or more concepts and ii) how extensively to train the AI model on each of the one or more concepts. Such determinations can be based on the relevance of each of one or more concepts in one or more predictions of a trained AI model based upon training data.

The AI engine can also determine when to train each concept, how much (or little) to train each concept based on its relevance, and, ultimately, produce a trained AI model. Furthermore, the AI engine can utilize meta-learning. In meta-learning, the AI engine keeps a record of each program it has seen, the data it used for training, and the generated AIs that it made. It also records how fast those AIs trained and how accurate they became. The AI engine learns over that dataset.

Note, when training of an AI object occurs, the hyper learner module 325 can be configured to save into the AI database 341 two versions of an AI object. A first version of an AI object is a collapsed tensile flow representation of the AI object. A second version of an AI object is the representation left in its nominal non-collapsed state. When the search engine retrieves the AI object in its nominal non-collapsed state, then another programmer desiring to reuse the AI object will be able to obtain outputs from the non-collapsed graph of nodes with all of its rich meta-data rather and then a collapsed concept with a single discrete output. The state of the AI data objects can be in a non-collapsed state so the trained AI object has its full rich data set, which then may be used by the user for reuse, reconfigured, or recomposed into a subsequent trained AI model.

The database management system also indexes and tracks different AI objects with an indication of what version is this AI object. Later versions of an AI object may be better trained for particular task but earlier versions of the AI object maybe more generally trained; and thus, reusable for wider range of related tasks, to then be further trained for that specific task.

The AI database 341 and other components in the AI engine cooperate to allow migrations of learned state to reconfigure a trained AI object. When a system has undergone substantial training achieving a learned state, and a subsequent change to the underlying mental models might necessitate retraining, it could be desirable to migrate the learned state rather than starting training from scratch. The AI engine can be configured to afford transitioning capabilities such that previously learned high dimensional representations can be migrated to appropriate, new, high dimensional representations. This can be achieved in a neural network by, for example, expanding the width of an input layer to account for alterations with zero-weight connections to downstream layers. The system can then artificially diminish the weights on connections from the input that are to be pruned until they hit zero and can then be fully pruned.

Deploy and Use

Once a trained AI model has been sufficiently trained, it can be deployed such that it can be used in a production application. The interface for using a deployed trained AI model is simple: the user submits data (of the same type as the trained AI model was trained with) to a trained AI model-server API and receives the trained AI model's evaluation of that data.

As a practical example of how to use a deployed trained AI model, a trained AI model can first be trained to recognize hand-written digits from the Mixed National Institute of Standards and Technology ("MNIST") dataset. An image can be created containing a handwritten digit, perhaps directly through a touch-based interface or indirectly by scanning a piece of paper with the handwritten digit written on it. The image can then be down sampled to a resolution of 28×28 and converted to grayscale, as this is the input schema used to train the example trained AI model. When submitted to the trained AI model-server through the trained AI model server API, the trained AI model can take the image as input and output a one-dimensional array of length 10 (whereby each array item represents the probability, as judged by the trained AI model, that the image is a digit corresponding to the index). The array could be the value returned to the user from the API, which the user could use as needed.

Command Line Interface ("CLI")

The CLI is a tool configured to enable users to configure the AI engine. The CLI is especially useful for automation and connection to other tools. Some actions can only be performed using the CLI. Some actions that can be performed using the CLI include loading a pedagogical programming language file and connecting a simulator.

Web Site

The web site is configured as a browser-based tool for configuring and analyzing AI models stored in the AI engine. The website can be used for sharing, collaborating, and learning. Some information that can be accessed from the web site is a visualization of an AI model's training progress.

Computing Infrastructure

Figure 1A:
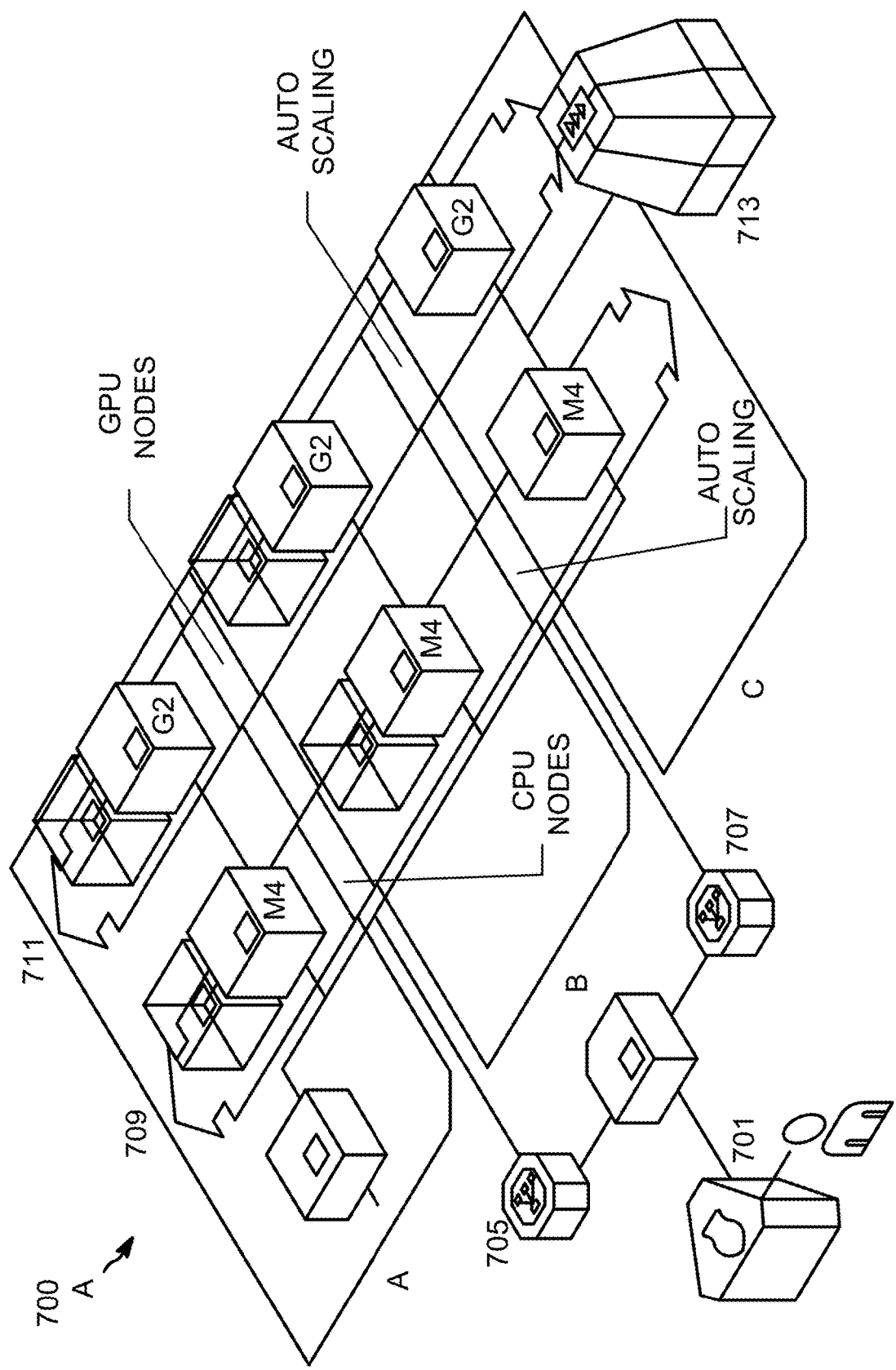

FIG. 1A provides a block diagram illustrating an AI system 700A and its cloud-based computing platforms infrastructure in accordance with an embodiment. A backend cloud platform can exist of various servers, processes, databases, and other components that connect over a network, such as the Internet, to a plurality of computing devices. The backend cloud platform is configured to handle the scaling, efficiency, etc. Such a cloud platform can be a public cloud, Virtual Public Cloud, or a private cloud. Note, a similar computing platform may also implemented on an on-premises computing platform such as FIG. 1B.

In an embodiment, a user, such as a software developer, can interface with the AI system 700A through an online interface 701. However, the user is not limited to the online interface, and the online interface is not limited to that shown in FIG. 1A. An input may be supplied from an online API, such as www.bons.ai, a command line interface, and a graphical user interface such as an Integrated Development Environment ("IDE") such as Mastermind™, available from Bonsai AI, Inc. of Berkeley, Calif. With this in mind, the AI system 700A of FIG. 1A can enable a user to make API and web requests through a domain name system ("DNS"), which requests can be optionally filtered through a proxy to route the API requests to an API load balancer 705 and the web requests to a web load balancer 707. Alternatively, the proxy service may be part of a service running on a CPU computing device. The API load balancer 705 can be configured to distribute the API requests among multiple processes wrapped in their own containers running in a containerization platform, such as a Docker-type network. The web load balancer 707 can be configured to distribute the web requests among the multiple processes wrapped in their own containers running in this containerization platform. The network can include a cluster of one or more central processing unit ("CPU") computing devices 709 and a cluster of one or more graphics processing unit ("GPU") computing devices 711. One or more services running in the network will scale to more or less CPU computing devices 709 and GPU computing devices 711 as needed. The CPU computing devices 709 can be utilized for most independent processes running on the swarm network. The GPU computing devices 711 can be utilized for the more computationally intensive independent processes such as TensorFlow and the learner process. Various services may run on either the CPU computing device 709 or in the GPU computing device 711, as capacity in that machine is available at the time.

As further shown in FIG. 1A, a logging Stack 713 can be shared among all production clusters for dedicated monitoring and an indexing/logging.

The cloud-based platform with multiple independent processes is configured for the user to define the AI problem to be solved. In an embodiment, all of the individual processes are wrapped into a container program such as a Docker. The software container allows each instance of that independent process to run independently on whatever computing device that instance is running on.

The individual processes in the AI engine utilize a scaling hardware platform, such as Amazon Web Services ("AWS"), so that the individual processes of the AI engine, the amount of Central Processing Units ("CPUs"), Graphics Processing Units ("GPUs"), and RAM may dynamically change overtime and rapidly change to scale to handle multiple users sending multiple AI models to be trained or multiple simulations from a single user to train one or more AI models.

For example, an engineer service can be configured to dynamically change an amount of computing devices 709, 711 overtime running independent processes and to rapidly change the amount to scale to handle multiple users sending multiple AI models to be trained. A conductor service or an engineer service can cause a first instance of an instructor process to be instantiated, loaded onto a CPU computing device, and then run on a first CPU computing device 709.

The AI engine may have multiple independent processes on the cloud-based platform. The multiple independent processes may be configured as an independent process wrapped in its own container so that multiple instances of the same processes, e.g. learner process and instructor process, can run simultaneously to scale to handle one or more users to perform actions. The actions can include 1) running multiple training sessions on two or more AI models at the same time, in parallel, 2) creating two or more AI models at the same time, 3) running a training session on one or more AI models while creating one or more AI models at the same time, 4) deploying and using two or more trained AI models to do predictions on data from one or more data sources, and 5) any combination of these four, on the same AI engine. CPU bound services can include, for example, a document database for storing AI objects such as an AI database; a Relational Database Server such as PostgreSQL; a time-series database 217 such as InfluxDB database optimized to capture training data going into and out of a metagraph (e.g., metagraph 400A or FIG. 4A) for at least a 100-episode set of training episodes for training an AI model; an AI-model service including an architect module and AI compiler; an AI-model web service; a conductor service; a watchman service; a CPU Engineer service; an instructor process; a predictor service; and other similar processes. GPU Bound services can include, for example, a GPU Engineer service, a learner process, and other computationally heavy services. For example, a first CPU computing device may load and run an architect module. A second CPU computing device may load and run, for example, an instructor process. A first GPU computing device may load and run, for example, a learner process. A first service such as an engineer service, may then change an amount of computing devices running independent processes by dynamically calling in a third CPU computing device to load and run, for example, a second instance of the instructor process, and calling in a second GPU computing device to load and run, for example, a second instance of the learner process.

Scaling in this system may dynamically change both 1) an amount of independent processes running and 2) an amount of computing devices configured to run those independent processes, where the independent processes are configured to cooperate with each other. The dynamically changing of an amount of computing devices, for example, more GPUs or CPUs in order to run additional instance of the independent processes allows multiple users to utilize the cloud-based system at the same time and to, for example, 1) conduct multiple training sessions for AI models in parallel, 2) deploy AI models for use, and 3) create new AI models, all at the same time. Clusters of hardware of CPU devices and GPU devices can be dynamically scaled in and out on, for example, an hourly basis based on percent load capacity used and an amount of RAM memory left compared to a current or expected need.

Figure 1B:
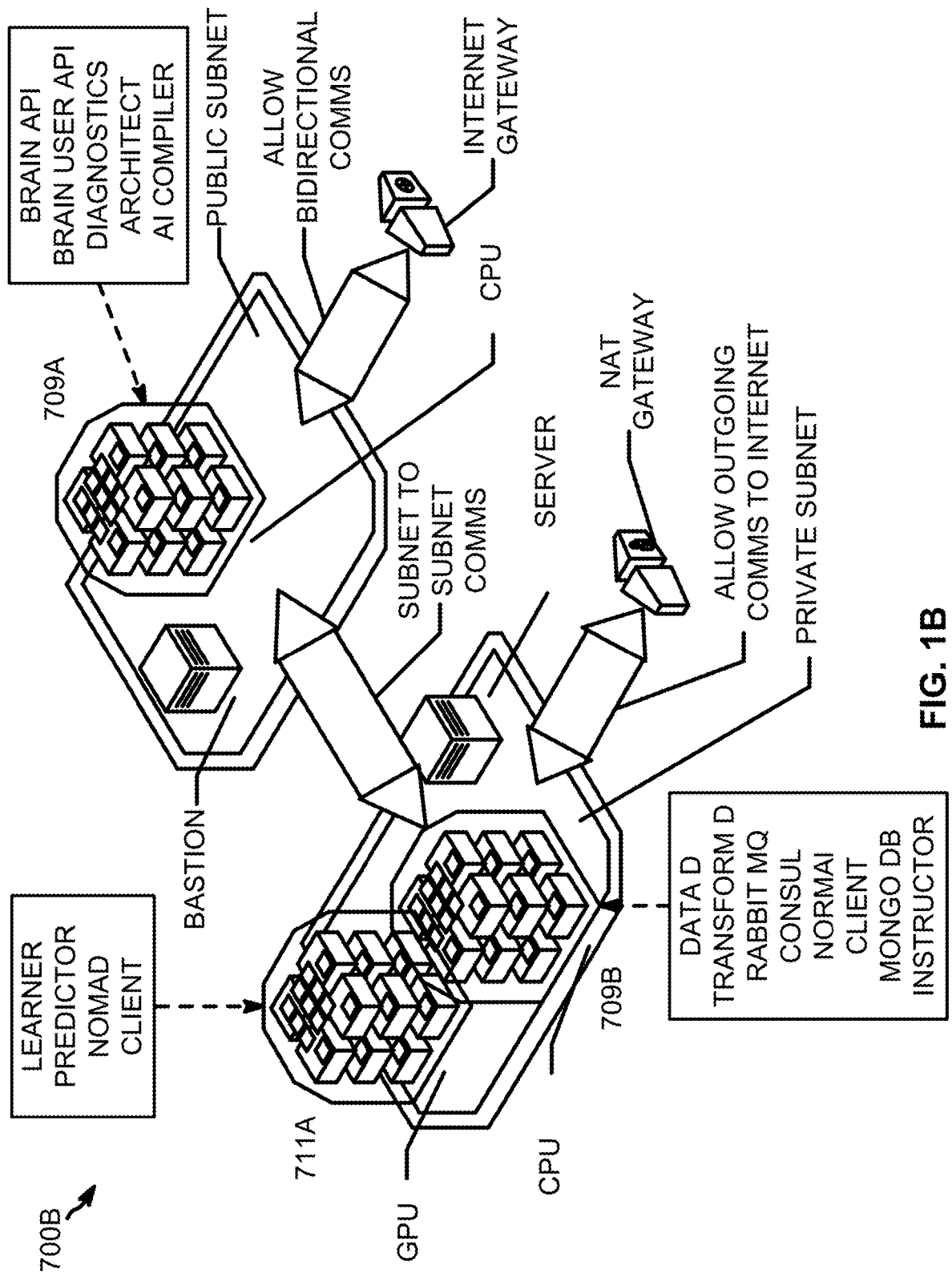

FIG. 1B provides a block diagram illustrating an AI system 700B and its on-premises based computing platforms infrastructure in accordance with an embodiment. Following on the AI system 700A, a bastion host server and one or more CPU computing devices, such as a first CPU computing device 709A and a second computing device 709B, can be on a public subnet for bidirectional communication through an Internet gateway. One or more GPU computing devices, such as a first GPU computing device 711A, can be on a private subnet communicatively coupled with the public subnet by means of a subnet there between. The one or more CPU computing devices on the public subnet can be utilized on a first CPU computing device 709A by the compiler and the architect module/process that are part of an AI-model service. One or more other CPU computing devices on a second CPU computing device 709B on the private subnet can be utilized by the instructor module. The GPU computing devices can be utilized by the learner module/process and the predictor module/process. As further shown in FIG. 1B, the private subnet can be configured to send outgoing communications to the Internet through a network address translation ("NAT") gateway.
Network FIG. 10 illustrates a number of electronic systems and devices communicating with each other in a network environment in accordance with an embodiment. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. As such, FIG. 10 illustrates any combination of server computing systems and client computing systems connected to each other via the communications network 820.

The communications network 820 can connect one or more server computing systems selected from at least a first server computing system 804A and a second server computing system 804B to each other and to at least one or more client computing systems as well. The server computing system 804A can be, for example, the one or more server systems of, for example, FIGS. 1A and 1B. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., laptop computer), a third mobile computing device or second portable computer 802F (e.g., tablet with an Android- or iOS-based operating system), a smart device or system incorporated into a first smart automobile 802D, a smart device or system incorporated into a first smart bicycle 802G, a first smart television 802H, a first virtual reality or augmented reality headset 804C, and the like.

The client computing systems (e.g., 802A—802H, and/or 804C) can include, for example, the software application or the hardware-based system in which the trained AI model can be deployed. Additionally, the server 804B may have a simulator configured to train an AI model with the AI engine of cloud 804A. Each of the one or more client computing systems and/or cloud platforms can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer.

Any one or more of the server computing systems can be a cloud provider. A cloud provider can install and operate application software in a cloud (e.g., the network 820 such as the Internet), and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 2) the request and response cycle from a dedicated on-line server, 3) the request and response cycle directly between a native application resident on a client device and the cloud-based remote access to another client computing system, and 4) combinations of these.

In an embodiment, the server computing system 804A can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users), can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

Computing Systems

FIG. 11 illustrates a computing system 900 that can be, wholly or partially, part of one or more of the server or client computing devices in accordance with an embodiment. With reference to FIG. 11, components of the computing system 900 can include, but are not limited to, a processing unit 920 having one or more processing cores, a system memory 930, and a system bus 921 that couples various system components including the system memory 930 to the processing unit 920. The system bus 921 may be any of several types of bus structures selected from a memory bus or memory controller, a peripheral bus, and a local bus using any of a variety of bus architectures.

Computing system 900 typically includes a variety of computing machine-readable media. Computing machine-readable media can be any available media that can be accessed by computing system 900 and includes both volatile and nonvolatile media, and removable and non-removable media. The system memory 930 includes computer storage media in the form of volatile and/or nonvolatile memory such as read only memory (ROM) 931 and random access memory (RAM) 932. A basic input/output system 933 (BIOS) is typically stored in ROM 931. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media. As an example, some client computing systems on the network 920 of FIG. 10 might not have optical or magnetic storage.

RAM 932 typically contains data and/or software that are immediately accessible to and/or presently being operated on by the processing unit 920. The RAM 932 can include a portion of the operating system 934, application programs 935, other executable software 936, and program data 937. The computing system 900 can also include other removable/non-removable volatile/nonvolatile computer storage media. By way of example only, FIG. 11 illustrates a memory 941 and a non-removable non-volatile memory interface 940. Other removable/non-removable, volatile/nonvolatile computer storage media that can be used in the example operating environment include, but are not limited to, USB 951, flash memory, RAM, ROM, and the like. USB 951 is typically connected to the system bus 921 by a removable memory interface, such as interface 950. In FIG. 11, for example, the memory 941 is illustrated for storing operating system 944, application programs 945, other executable software 946, and program data 947. Operating system 944, application programs 945, other executable software 946, and program data 947 are given different numbers.

A user may enter commands and information into the computing system 900 through input devices such as a keyboard, touchscreen, or software or hardware input buttons 962, a microphone 963, a pointing device and/or scrolling input component, such as a mouse, trackball or touch pad. The microphone 963 can cooperate with speech recognition software. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a hand-held device, a server, a router, a network PC, a peer device or other common network node, and typically includes many or all of the elements described above relative to the computing system 900. FIG. 11 illustrates remote application programs 985 as residing on remote computing device 980. The logical connections depicted in FIG. 9 can include a personal area network ("PAN") 972 (e.g., Bluetooth®), a local area network ("LAN") 971 (e.g., Wi-Fi), and a wide area network ("WAN") 973 (e.g., cellular network), but may also include other networks. Such networking environments are commonplace in offices, enterprise-wide computer networks, intranets and the Internet. A browser application may be resident on the computing device and stored in the memory.

When used in a LAN networking environment, the computing system 900 is connected to the LAN 971 through a network interface or adapter 970, which can be, for example, a Bluetooth® or Wi-Fi adapter. When used in a WAN networking environment (e.g., Internet), the computing system 900 typically includes some means for establishing communications over the WAN 973.

It should be noted that the present design can be carried out on a computing system such as that described with respect to FIG. 9. However, the present design can be carried out on a server, a computing device devoted to message handling, or on a distributed system in which different portions of the present design are carried out on different parts of the distributed computing system.

In an embodiment, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as PYTHON™, JAVA™, HTTP, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

Many functions performed by electronic hardware components can be duplicated by software emulation. Thus, a software program written to accomplish those same functions can emulate the functionality of the hardware components in input-output circuitry.

FIGS. 12A through 12C provide a flow diagram illustrating a method for a hierarchical decomposition deep reinforcement learning for an Artificial Intelligence model in accordance with an embodiment. As shown, the method includes a number of steps. Note, the following steps may be performed in any order where logically possible, and not all of them need to be performed.

In step 2, the AI engine may be configured to choose from a library of algorithms to use when automatically assembling and building different learning topologies to solve different concepts making up a resulting AI model.

In step 4, the AI engine may be configured to integrate both i) one or more dynamic programming training algorithms as well as ii) one or more policy optimization algorithms to build the different learning topologies to solve the different concepts contained with an AI model in order to solve a wide variety of problem types. Each concept contained in the AI model then can use a most appropriate approach for achieving a mission of that concept. For example, a learning topology representing a first concept may be built by the module with a dynamic programming training algorithm, while a learning topology representing a second concept in the same AI model may be built by the module with a policy optimization algorithm.

In step 6, the AI engine may be configured to be responsible for creating and optimizing the different learning topologies (e.g. neural networks, decision trees, etc.) and learning algorithms based on i) one or more mental models and ii) one or more reference databases of problem types as well as corresponding learning topologies and algorithms that have been previous productive in solving similar and/or analogous problem types. The hyper learner process in the architect module may be configured to take in a codified mental model and its pedagogy. The module may be configured to then propose a set of candidate learning algorithms, learning topologies, and previous productive configurations that the hyper learner process in the architect module believes will be best able to learn that concept in the AI model. The module may be configured to choose the most appropriate algorithm for that concept based on heuristics including a type of problem trying to be solved as well as a type of data expected to be utilized in that concept.

In step 8, the modules of the AI engine internally as part of the compilation process produces an intermediary representation of a machine learning model using a model description language, where the model description language provides a coarse-level description of the AI model that may be later used to instantiate in a particular framework, and when generating the different concepts in the AI model to solve, then the architect module generates proposed model description language descriptors, which are then instantiated as needed.

In step 10, the library of algorithms contains the learning algorithms. The first dynamic programming training algorithm may consisting of i) Q-learning with a Q-table, ii) a DQN, and iii) any combination of both while the first policy optimization algorithm may consisting of i) a TRPO, ii) a TRPO-GAE algorithm, iii) a DDPG, and iv) any combination of these.

In step 12, the module may be configured to analyze a number of different parameters when selecting which algorithm to use for the learning topology making up that concept in the AI model. For example:

1) where when the problem to be solved by the second concept can be done with policy only, then the architect module may be configured to select either a TRPO algorithm or a TRPO-GAE to build the learning topology of the second concept.

2) where when the architect module analyzes factors of the concept to be learned potentially needs to unlearn bad behavior, then the architect module uses a TRPO algorithm in combination with a Delta network to i) extend functionality for robotics as well as ii) this gives the AI model undergoing training an ability to unlearn bad behavior.

3) when the concept consists of just state actions or discrete state changes, then the architect module may be configured to select a Q-table or a DQN algorithm to build the learning topology of the first concept.

4) when the architect module analyzes parameters of continuously changing actions or state data, then the architect module will select a DDPG algorithm or a TRPO algorithm to build the learning topology in the second concept.

5) when the architect module analyzes parameters of the problem to be solved may be an off policy problem, where an off policy problem can be solved by observing other data than coming from out of the algorithm itself, then the architect module may be configured to select a DDPG algorithm to build the learning topology in the second concept.

6) The topology of the first concept may be built with the first dynamic programming training algorithm, which may be Q-learning with a Q-table, while the topology of the second concept in the AI model may be built with a first policy optimization algorithm, which may be a TRPO-GAE algorithm, for reinforcement learning solutions for the first concept and the second concept.

These and many other examples are possible.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A computing device hosting an artificial intelligence (AI) engine, the computing device comprising:
   a processor; and
   a memory holding instructions executable by the processor to
      display a user interface to supply information to and/or receive information from the AI engine;
      receive, via the user interface, a submission requesting to generate and train an AI model for a physical task;
      based upon the submission, choose one or more dynamic programming training algorithms from a library of algorithms to automatically assemble and build a first learning topology for a first aspect of the AI model;
      based upon the submission, choose one or more policy optimization algorithms from the library of algorithms to automatically assemble and build a second learning topology for a second aspect of the AI model;
      obtain training data;
      train the AI model using the training data to generate and provide a trained AI model; and
      deploy the trained AI model to a robotic device configured to perform the physical task.

2. The computing device of claim 1, wherein the instructions are further executable by the processor to:
   train the first learning topology of the AI model using the training data to achieve the first aspect of the AI model;
   train the second learning topology of the AI model using the training data to achieve the second aspect of the AI model; and
   train the first aspect and the second aspect of the AI model to cooperate to perform a task.

3. The computing device of claim 1, wherein the instructions are further executable by the processor to receive the submission coded in a pedagogical software programming code.

4. The computing device of claim 3, wherein the submission comprises one or more mental models coded in the pedagogical software programming code, each of the one or more mental models comprising one or more distinct aspects of a task, and wherein the instructions are further executable to
   identify one or more learning topologies and algorithms determined to be previously trained to solve problem types determined to be similar and/or analogous to each aspect of the one or more mental models, and
   build the first learning topology and the second learning topology based on identifying the one or more previously trained learning topologies and algorithms.

5. The computing device of claim 1, wherein the instructions are further executable by the processor to choose the one or more dynamic programming training algorithms and/or the one or more policy optimization algorithms based on heuristics including a type of problem to be solved and a type of data to be utilized.

6. The computing device of claim 1, wherein the one or more dynamic programming training algorithms comprise one or more of Q-learning with a Q-table and/or a Deep Q-Network, and wherein the one or more policy optimization algorithms comprise one or more of a Trust Region Policy Optimization (TRPO) algorithm, a Trust Region Policy Optimization with a Generalized Advantage Estimation (TRPO-GAE) algorithm, and/or a Deep Deterministic Policy Gradients (DDPG) algorithm.

7. The computing device of claim 1, wherein the instructions are further executable by the processor to unlearn.

8. The computing device of claim 1, wherein the instructions are further executable by the processor to select a Q-table or a Deep Q-Network algorithm to build the learning topology for the first aspect of the AI model when the first aspect comprises one or more of a state action and/or a discrete state change.

9. The computing device of claim 1, wherein the instructions are further executable by the processor to select a Deep Deterministic Policy Gradient (DDPG) algorithm or a Trust Region Policy Optimization (TRPO) algorithm to build the learning topology for the second aspect of the AI model when the second aspect comprises continuously changing actions or state data.

10. The computing device of claim 1, wherein the instructions are further executable by the processor to select a Deep Deterministic Policy Gradient (DDPG) algorithm to build the learning topology for the second aspect when the second aspect comprises an off-policy problem.

11. On a computing device, a method for generating an artificial intelligence (AI) model, the method comprising:
   displaying a user interface to supply information to and/or receive information from an AI engine;
   receiving, via the user interface, a submission requesting to generate and train an AI model for a physical task;
   based upon the submission, choosing one or more dynamic programming training algorithms from a library of algorithms to automatically assemble and build a first learning topology for a first aspect of the AI model;
   based upon the submission, choosing one or more policy optimization algorithms from the library of algorithms to automatically assemble and build a second learning topology for a second aspect of the AI model;

obtaining training data;

training the AI model with the training data to generate and provide a trained AI model; and deploying the trained AI model to a robotic device configured to perform the physical task.

12. The method of claim 11, wherein training the AI model comprises training the first learning topology of the AI model using the training data to achieve the first aspect of the AI model;

training the second learning topology of the AI model using the training data to achieve the second aspect of the AI model; and then training the first aspect and the second aspect of the AI model to cooperate to perform a task.

13. The method of claim 11, wherein receiving the submission comprises receiving one or more mental models coded in a pedagogical software programming code, each of the one or more mental models comprising one or more distinct aspects of a task, and the method further comprising building the first learning topology and the second learning topology based on identifying one or more learning topologies and algorithms determined to be previously trained to solve problem types determined to be similar and/or analogous to each aspect of the one or more mental models.

14. The method of claim 11, further comprising choosing the one or more dynamic programming training algorithms and the one or more policy optimization algorithms based on heuristics including a type of problem to be solved and a type of data to be utilized.

15. The method of claim 11, wherein choosing the one or more dynamic programming training algorithms comprises choosing one or more of Q-learning with a Q-table and/or a deep Q-network; and wherein choosing the one or more policy optimization algorithms comprises choosing one or more of a Trust Region Policy Optimization (TRPO) algorithm, a Trust Region Policy Optimization with a Generalized Advantage Estimation (TRPO-GAE) algorithm, and/or a Deep Deterministic Policy Gradients (DDPG) algorithm.

16. The method of claim 11, further comprising unlearning.

17. The method of claim 11, wherein choosing the one or more dynamic programming training algorithms comprises selecting either a Q-table or a Deep Q-Network algorithm to build the learning topology for the first aspect of the AI model when the first aspect comprises one or more of a state action and/or a discrete state change.

18. The method of claim 11, wherein choosing the one or more policy optimization algorithms comprises selecting a Deep Deterministic Policy Gradient (DDPG) algorithm to build the learning topology for the second aspect when the second aspect comprises an off-policy problem.

19. On a computing device, a method for generating an artificial intelligence (AI) model for a physical task, the method comprising:

displaying a user interface to supply information to and/or receive information from an AI engine;

receiving, via the user interface, a submission requesting to generate and train an AI model;

receiving one or more mental models coded in a pedagogical software programming code, each of the one or more mental models comprising one or more distinct aspects of the task;

identifying one or more learning topologies and algorithms determined to be previously trained to solve problem types determined to be similar and/or analogous to each aspect of the one or more mental models;

choosing one or more dynamic programming training algorithms from a library of algorithms to automatically assemble and build a first learning topology for a first aspect of the AI model;

choosing one or more policy optimization algorithms from the library of algorithms to automatically assemble and build a second learning topology for a second aspect of the AI model;

obtaining training data;

training the first learning topology of the AI model;

training the second learning topology of the AI model;

training the first aspect and the second aspect of the AI model to cooperate to achieve the task;

generating and providing a trained AI model; and deploying the trained AI model to a robotic device configured to perform the physical task.

20. The method of claim 19, wherein the first learning topology and the second learning topology are trained in a temporally overlapping manner.

* * * * *